(12) United States Patent
Stinson et al.

(10) Patent No.: US 12,015,593 B2
(45) Date of Patent: Jun. 18, 2024

(54) METHODS AND SYSTEMS FOR IMPROVED ANALYTICS

(71) Applicant: QlikTech International AB, Lund (SE)

(72) Inventors: Jeremiah Stinson, Doylestown, PA (US); Scott Clark, Ottawa (CA); Boris Kuschel, Ottawa (CA)

(73) Assignee: QlikTech International AB, Lund (SE)

( * ) Notice: Subject to any disclaimer, the term of this patent is extended or adjusted under 35 U.S.C. 154(b) by 384 days.

(21) Appl. No.: 17/459,894

(22) Filed: Aug. 27, 2021

(65) Prior Publication Data

US 2022/0124072 A1 Apr. 21, 2022

Related U.S. Application Data

(60) Provisional application No. 63/094,562, filed on Oct. 21, 2020.

(51) Int. Cl.
| | |
|---|---|
| *H04L 29/06* | (2006.01) |
| *G06F 8/61* | (2018.01) |
| *H04L 9/40* | (2022.01) |
| *H04L 41/0803* | (2022.01) |
| *H04L 43/045* | (2022.01) |
| *H04L 67/133* | (2022.01) |

(52) U.S. Cl.
CPC ............ *H04L 63/0272* (2013.01); *G06F 8/63* (2013.01); *H04L 41/0803* (2013.01); *H04L 43/045* (2013.01); *H04L 63/0428* (2013.01); *H04L 63/06* (2013.01); *H04L 63/123* (2013.01); *H04L 67/133* (2022.05)

(58) Field of Classification Search
CPC ............... H04L 63/0272; H04L 67/133; H04L 41/0803; H04L 43/045; H04L 63/0428; H04L 63/06; H04L 63/123; H04L 67/1097; G06F 8/63; G06F 16/27
See application file for complete search history.

(56) References Cited

U.S. PATENT DOCUMENTS

| | | | |
|---|---|---|---|
| 10,411,975 B2 | 9/2019 | Martinez | |
| 2011/0154018 A1 | 6/2011 | Edstrom | |
| 2012/0281708 A1 | 11/2012 | Chauhan | |
| 2016/0261564 A1* | 9/2016 | Foxhoven | ............... H04L 63/20 |
| 2016/0366233 A1 | 12/2016 | Le | |
| 2017/0006119 A1* | 1/2017 | Pogrebinsky | ......... G06F 3/0482 |
| 2017/0116428 A1* | 4/2017 | Wu | ...................... G06F 21/6209 |
| 2017/0366395 A1 | 12/2017 | Goldfarb | |

OTHER PUBLICATIONS

European Search Report dated Feb. 23, 2022, for EP 21203860.8 (8 pages).

(Continued)

*Primary Examiner* — Yogesh Paliwal
(74) *Attorney, Agent, or Firm* — Ballard Spahr LLP

(57) ABSTRACT

Methods and systems for improved analytics are provided. A Software as a Service (SaaS) platform may be implemented as a distributed system using a public infrastructure, such as a public cloud, and an on-premises infrastructure, such as a private cloud. A control plane for the SaaS platform may reside in the public cloud, while a data plane for the SaaS platform may reside in the on-premises private cloud.

7 Claims, 22 Drawing Sheets

(56) References Cited

OTHER PUBLICATIONS

"Bringing multi-cloud analytics to your data with BigQuery Omni" Jun. 14, 2020 (available at: https://cloud.google.com/blog/products/data-analytics/introducing-bigquery-omni) (5 pages).
"What is an on-premises data gateway?" Jul. 15, 2019 (available at: https://docs.microsoft.com/en-US/data-integration/gateway/service-gateway-onprem) (3 pages).

* cited by examiner

FIG. 12

| Client | Year | Sum (Number * Price) |
|--------|------|----------------------|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

Sum (Number * Price) Per Client, Year

|  | 1999 | <NULL> | <ALL> |
|---|------|--------|-------|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

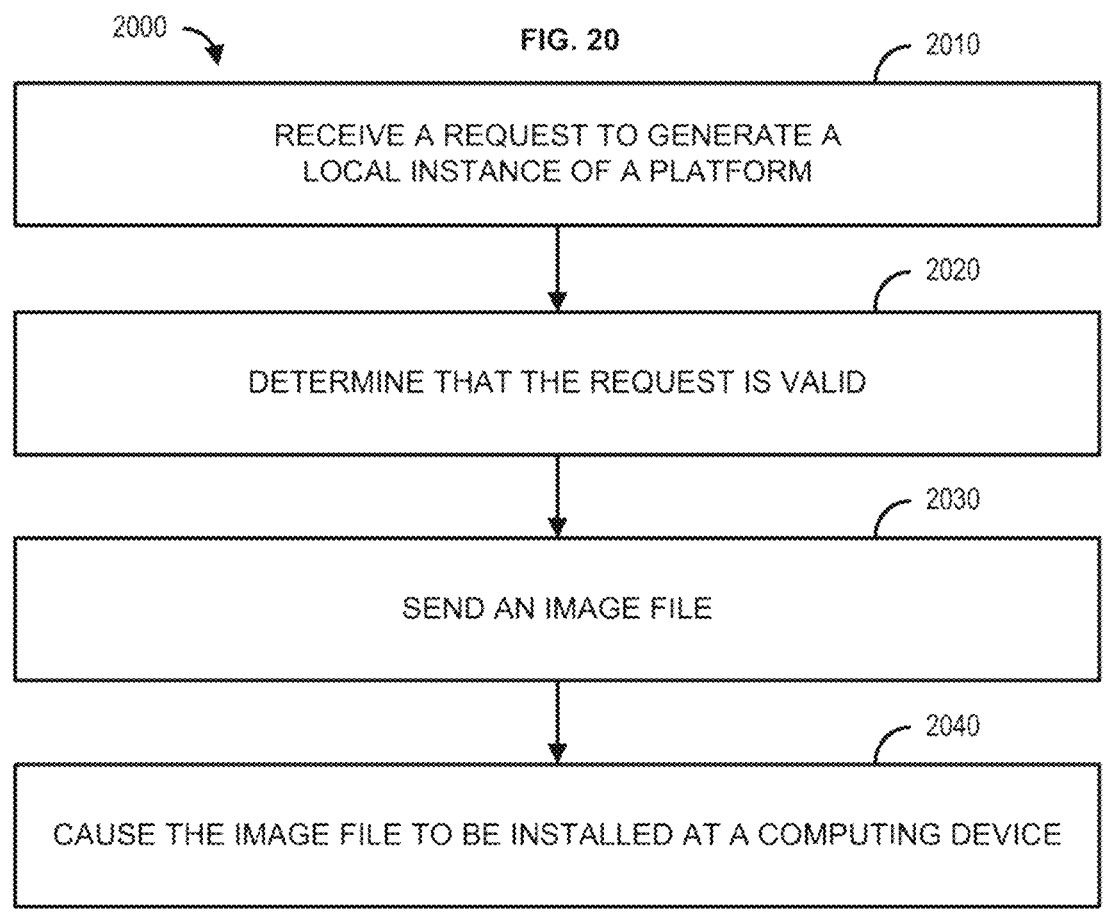

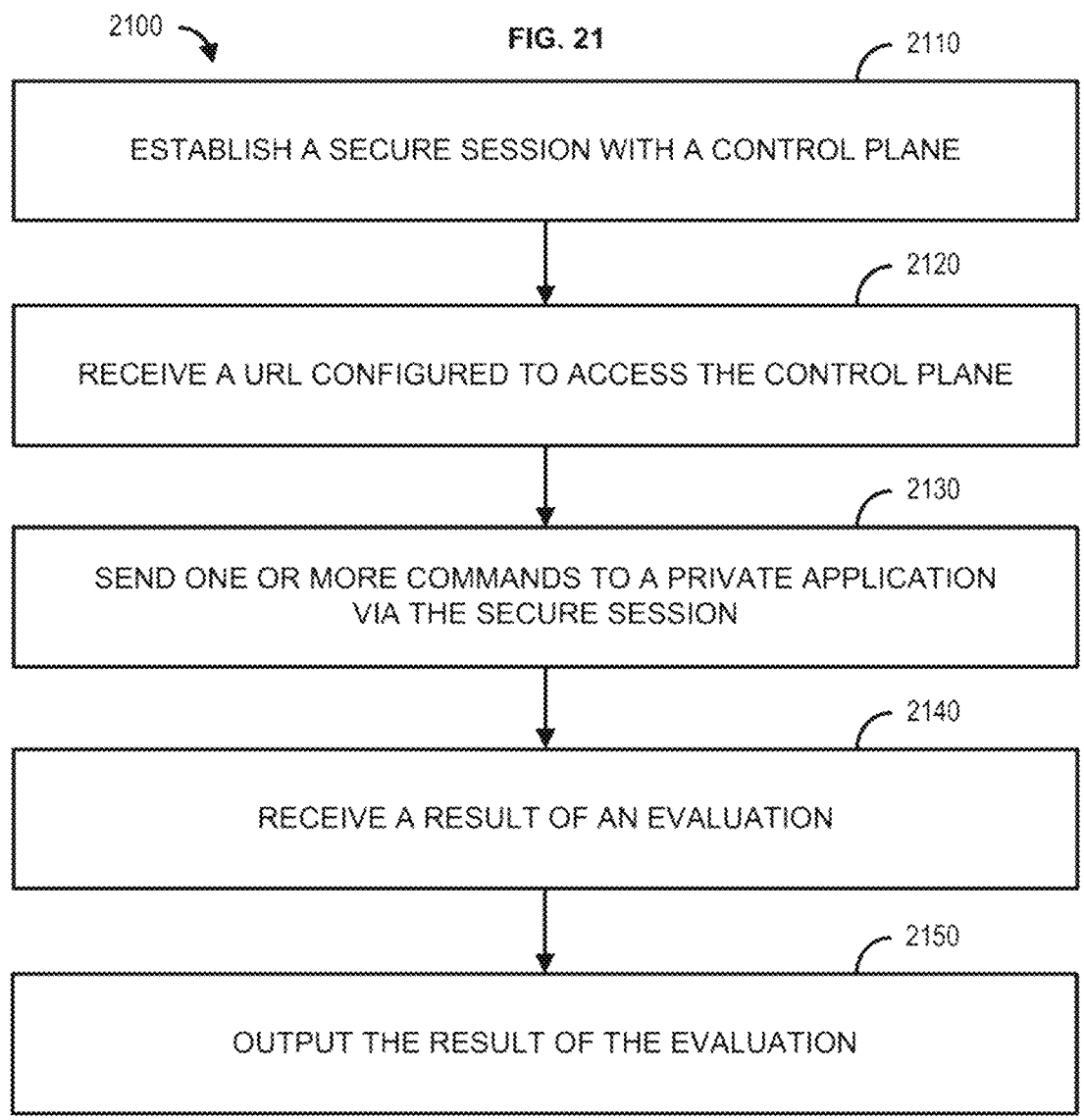

METHODS AND SYSTEMS FOR IMPROVED ANALYTICS

CROSS-REFERENCE TO RELATED PATENT APPLICATION

This application claims priority to U.S. Provisional App. No. 63/094,562, which was filed on Oct. 21, 2020, and is incorporated by reference in its entirety herein.

BACKGROUND

As enterprises and organizations become less centralized, efficient and secure access to propriety data has become a critical goal for network and database administrators. Historically, network and database administrators have been cautious about migrating proprietary data to cloud and/or hosted environments. Concerns include security issues as well as accessibility. These and other considerations are described herein.

SUMMARY

It is to be understood that both the following general description and the following detailed description are exemplary and explanatory only and are not restrictive. Methods and systems for improved analytics are provided. A Software as a Service (SaaS) platform may be implemented as a distributed system using a public infrastructure, such as a public cloud, and an on-premises infrastructure, such as a private cloud. A control plane for the SaaS platform may reside in the public cloud, while a data plane for the SaaS platform may reside in the on-premises private cloud.

For example, a first computing device within the public cloud may receive a request to generate a local instance of the platform. The first computing device may determine that the request is valid. The first computing device may send an image file to a second computing device within the private cloud. The image file may comprise one or more analytics tools associated with the platform. The one or more analytics tools may be part of an analytics stack. The first computing device may cause the image file to be installed at the second computing device. Upon installation of the image file, the second computing device may generate the local instance of the platform.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 12 shows example data tables;
FIG. 20 shows a flowchart for an example method;
and
FIG. 21 shows a flowchart for an example method.

DETAILED DESCRIPTION

Figure 1A:
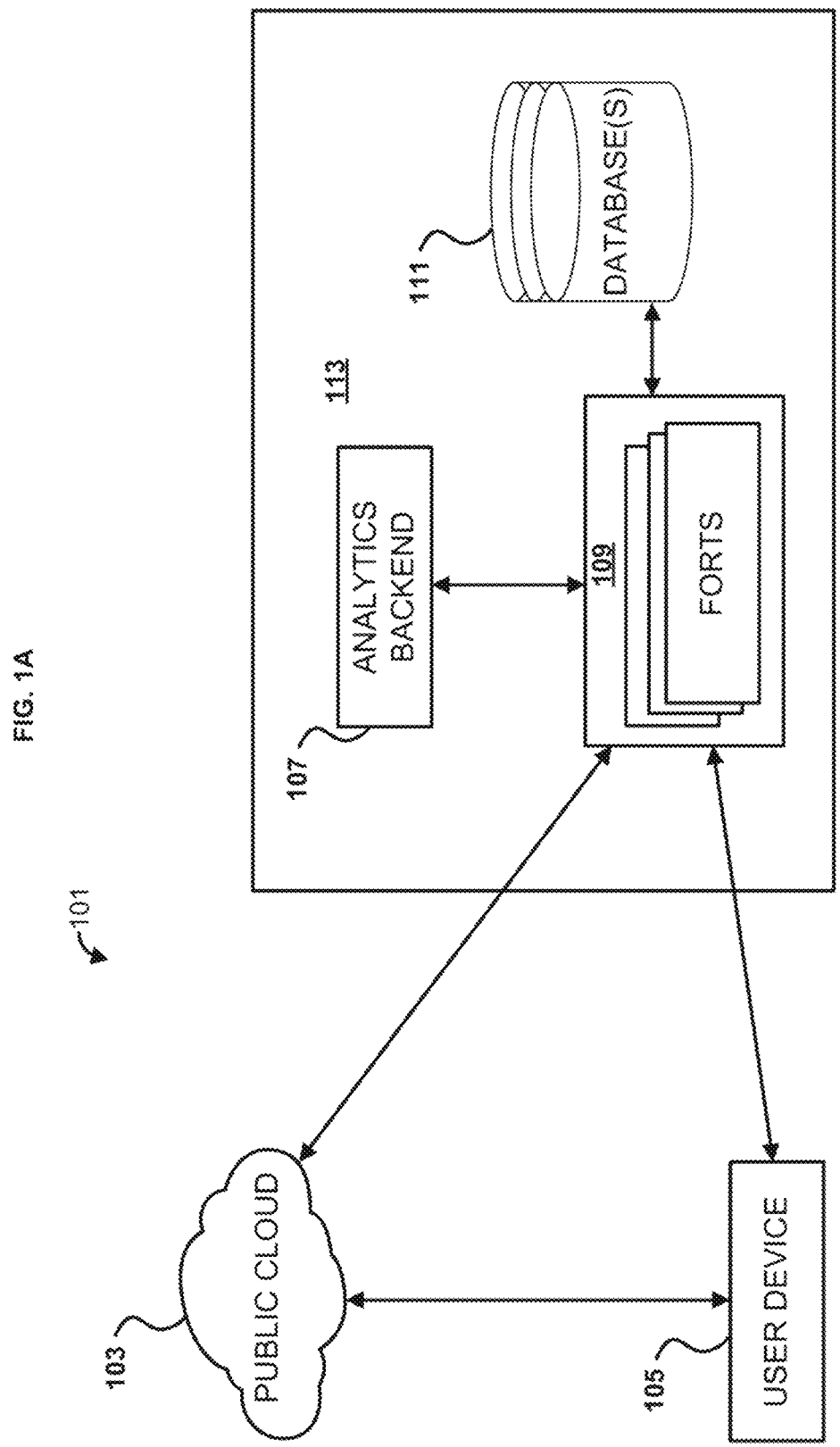
FIG. 1A shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for improved analytics. The present methods and systems may provide a more efficient and secure environment for storing, accessing, and using an enterprise's or organization's proprietary data. Proprietary data may include, for example, operational data, historical records, data regarding core elements of products or services, current and historical financial data, private intellectual property data (e.g., material for unfiled patent applications, copyrighted material, trade secrets, etc.), and/or the like.

Historically, enterprises and organizations housed their proprietary data in databases located in many different environments, such as a corporate data warehouse/datamart, a virtual private cloud, a hosted co-location, desktop(s)/laptop(s), and/or or hosted cloud environments. Recently, the need to share proprietary data globally and the added flexibility offered by analytic performance in the cloud have made decisions regarding proprietary data more complicated. Enterprises and organizations must find new ways to share their proprietary data in a global way, while being mindful of the technical and security challenges involved with sending large amounts of data over the Internet.

The present methods and systems provide improvement to existing analytics solutions for proprietary data. For example, a Software as a Service (SaaS) platform may be implemented as a distributed system using a public infrastructure, such as a public cloud, and an on-premises infrastructure, such as a private cloud. A control plane for the platform may reside in the public cloud, while a data plane for the platform may reside in the on-premises private cloud.

In this way, the present methods and systems may enable proprietary data to remain within the "castle" walls of an enterprise or an organization, while simultaneously providing access to the data by outside users. The platform contemplated by the present methods and systems may employ a plurality of on-premises "forts" within the confines of an enterprise or an organization. Each of the forts may include all of the necessary tools to provide the power of existing SaaS platforms, such as a complete analytics stack, while keeping proprietary data completely within the enterprise or the organization (e.g., behind a firewall). The plurality of forts may therefore combine the inherent security of storing propriety data on-premises with the power and flexibility of a SaaS platform. The present methods and systems may provide an additional improvement over current solutions by eliminating overhead required by the current solutions with respect to maintaining a complete SaaS orchestration platform, such as Kubernetes™ or one or more Windows™ servers.

FIG. 1A shows a block diagram of an example system 101 for improved analytics. As discussed herein, the present methods and systems provide improvement to existing analytics solutions for storing, accessing, and using an enterprise's or organization's proprietary data. A Software as a Service (SaaS) platform may be implemented as a distributed system using a public infrastructure, such as a public cloud 103 (e.g., a public cloud network), and an on-premises infrastructure, such as a private cloud 113 (e.g., a private cloud network). A control plane for the platform may reside in the public cloud 103, while a data plane for the platform may reside in the on-premises private cloud 113. The system 101 may employ a plurality of on-premises "forts" 109 within the private cloud 113 (e.g., within an enterprise or an organization). Each of the forts 109 may comprise one or more computing devices (e.g., servers, storage arrays, network interfaces, etc.) that host (e.g., manage, execute, etc.) parts of the SaaS platform, such as a complete analytics stack as further described herein.

The SaaS platform (referred to herein as "the SaaS platform" or simply "the platform") may include a control plane and a data plane. Elements of the control plane may be maintained by the platform and may be accessed via the public cloud 103. The control plane may be used to monitor and manage elements of the data plane. For example, the control plane may include user authentication and access services. The data plane may be maintained by the enterprise/organization (e.g., the entity associated with the on-premises forts 109). The data plane may be accessed via the on-premises private cloud 113. The data plane may be used to manage on-premises resources (e.g. servers, storage arrays, network interfaces, etc.). For example the data plane may be used to manage the forts 109, one or more databases 111, and/or an analytics backend 107. The one or more databases 111 may house proprietary data for the enterprise/organization. The analytics backend 107 may include software, applications, etc., for storing, managing, manipulating, and/or accessing the proprietary data housed in the one or more databases 111. The data plane may be implemented as a plurality of software agents, APIs, controllers, etc.

Each of the forts 109 may be a local instance of the SaaS platform. The forts 109 may be used to separate the data plane and the control plane in order to allow a user of a user device 105 to access the proprietary data housed in the one or more databases 111 while retaining all of the proprietary data within the private cloud 113 (e.g., within the enterprise/organization). The system 101 may be configured such that the user of the user device 105 may have a seamless experience as they move between content located within the public cloud 103 and the private cloud 113. For example, the user of the user device 105 may use a browser to access content and/or services of the SaaS platform via the public cloud 103. Proprietary data required by the content and/or the services may be accessed via browser calls initiated by the user device's 105 browser. The browser calls for the required proprietary data may be made directly to one or more of the forts 109, even for data uploads. All communications between the SaaS platform via the public could 103 and the forts 109 may be initiated from the forts 109. The forts 109 may push minimal metadata associated with the proprietary data back to the SaaS platform via the public could 103 in order to allow for orchestration between forts 109 and to ensure an exceptional user experience. Additionally, the forts 109 may poll the SaaS platform via the public could 103 on a set interval to retrieve request for scheduled workloads and to allow for asynchronous replication of metadata between the forts 109. Further, the proprietary data and related application files may be stored in the one or more databases 111 to allow for seamless interactions between the forts 109. In this way, the system 101 may ensure that all proprietary data remains within the private cloud 113 and never crosses into the public cloud 103, therefore guaranteeing a natural barrier between the data plane and the control plane.

Figure 1B:
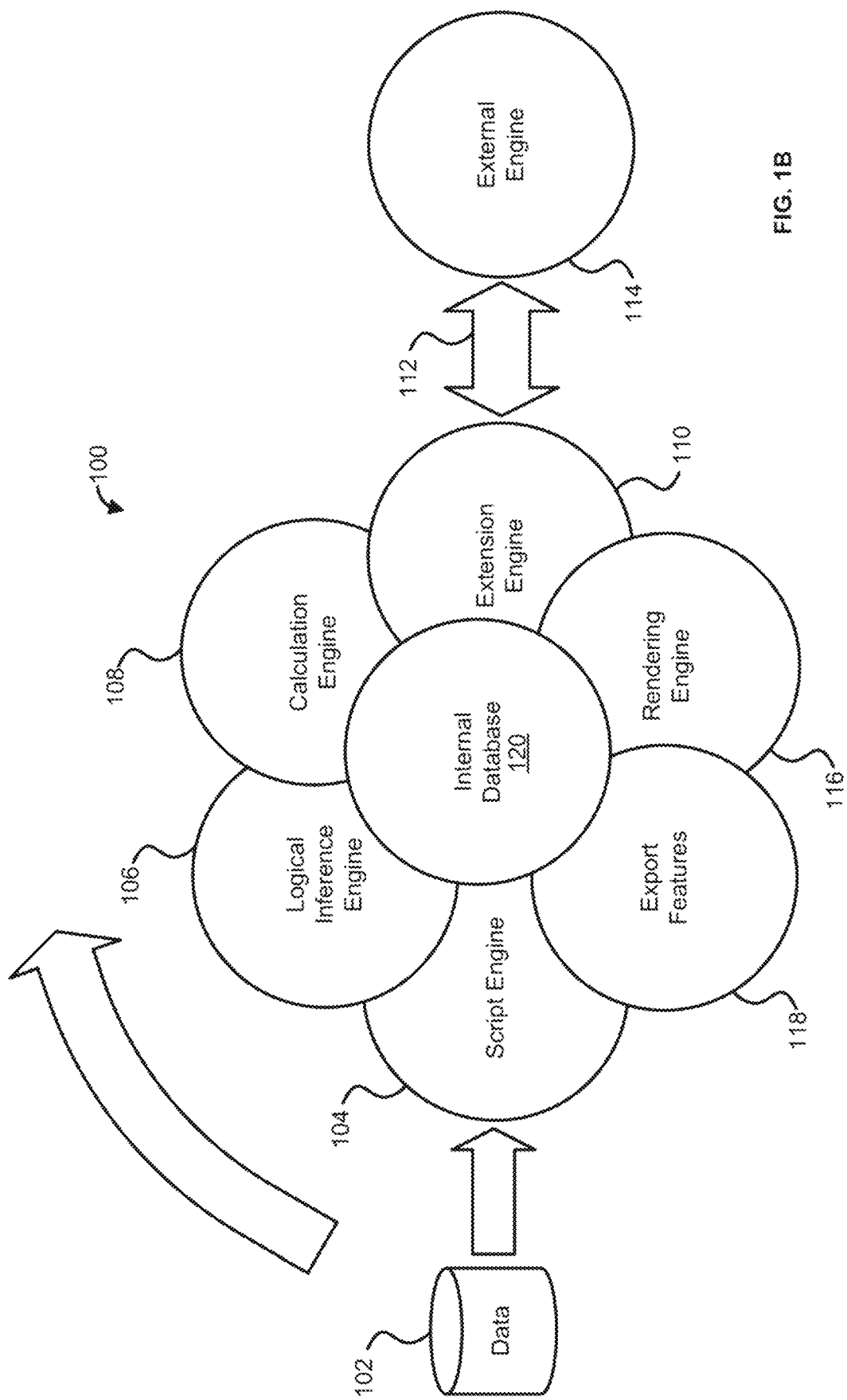
FIG. 1B shows an example system.

Deployment of the forts 109 is discussed further below. As described herein, each deployed fort 109 may be a local instance of the SaaS platform, and the analytics backend 107 may include software, applications, etc., of the SaaS platform that may be used for storing, managing, manipulating, and/or accessing the proprietary data housed in the one or more databases 111. FIG. 1B illustrates example aspects and functionality of the analytics backend 107 and the analytics stack of the SaaS platform implemented by the forts 109 within the private cloud 113. For example, the analytics stack within the analytics backend 107 and/or each of the forts 109 may include an associative data indexing engine 100 and/or one or more components thereof (e.g., shown in FIG. 1B). As shown in FIG. 1B, the associative data indexing engine 100 may have data flowing in from the left and operations starting from a script engine 104 and going clockwise (indicated by the clockwise arrow) to export features 118. Data from a data source 102 (e.g., the one or more databases 111) can be extracted by a script engine 104. The data source 102 can comprise any type of known database, such as relational databases, post-relational databases, object-oriented databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

Figure 2:
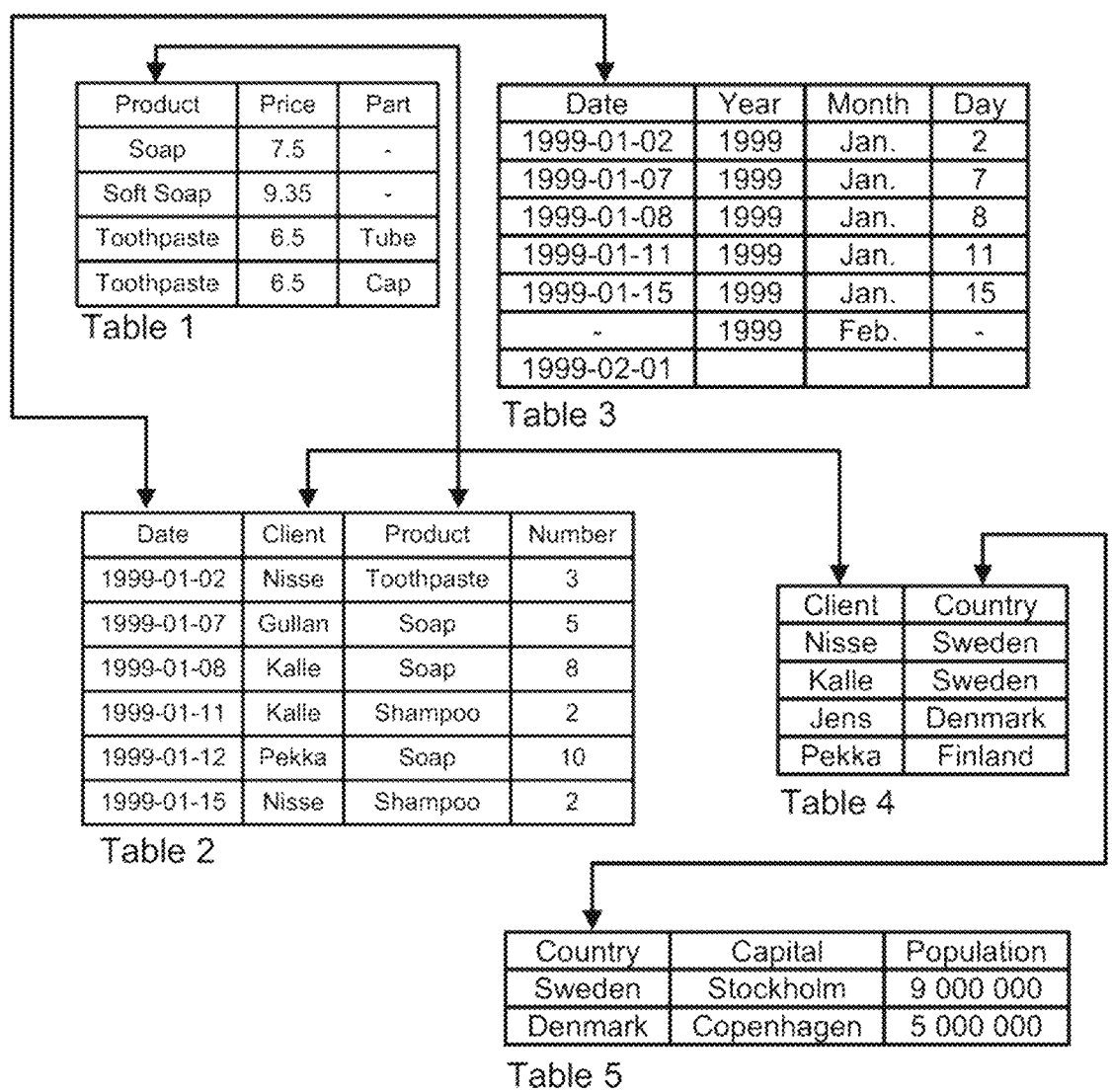
FIG. 2 shows an example data table.

An example data source 102 (e.g., a database), as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

Returning to FIG. 1, in an aspect, the extraction of the data can comprise extracting an initial data set or scope from the data source 102, e.g. by reading the initial data set into the primary memory (e.g. RAM) of a computer such as one of the forts 109. The initial data set can comprise the entire contents of the data source 102, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102 (e.g., a query received from a user device/interface) a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a data set.

Once the data has been extracted, a user interface can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the data set, causing a logical inference engine 106 to evaluate a number of filters on the data set. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

Figure 3:
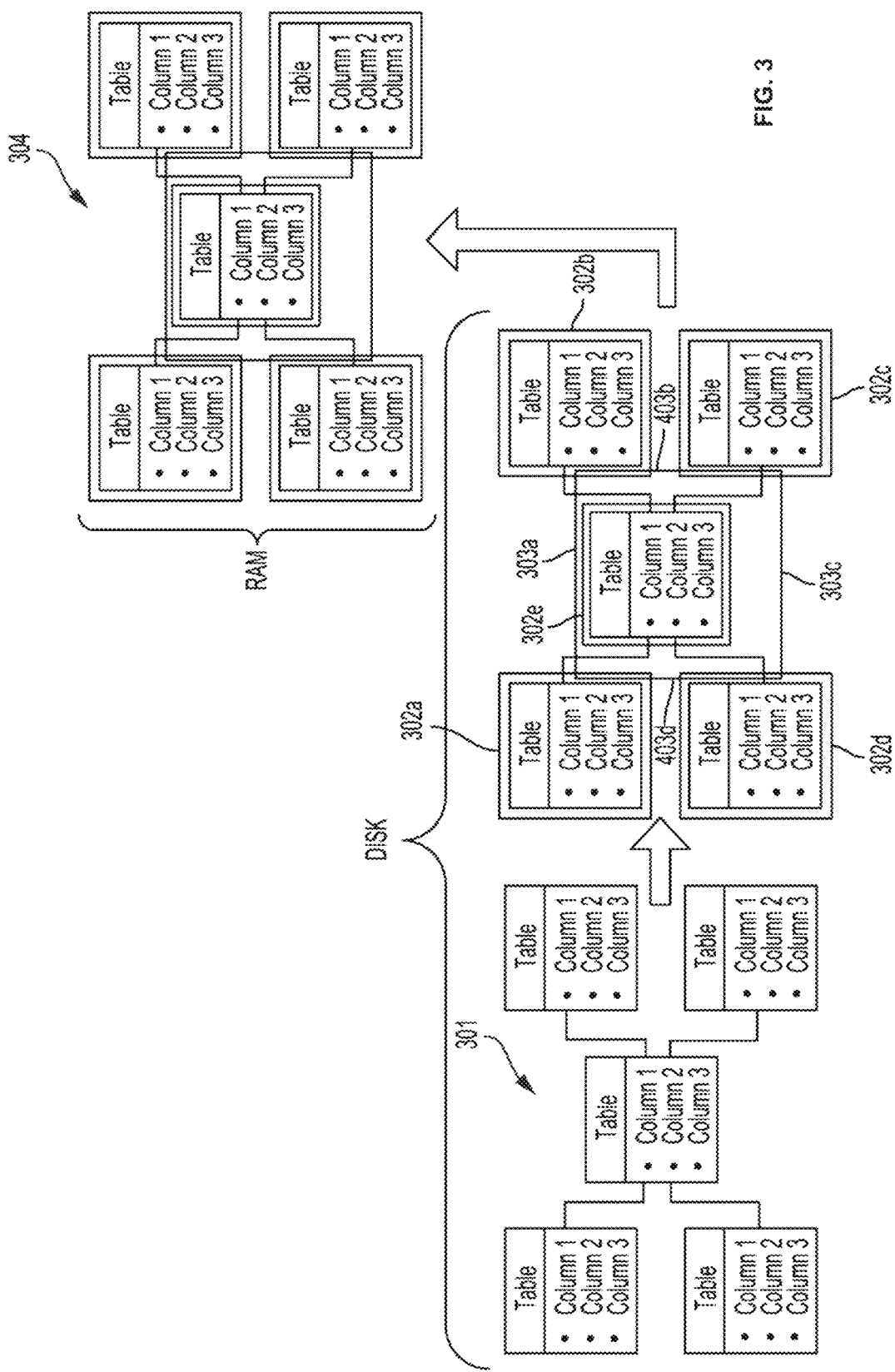
FIG. 3 shows an example data model.

The logical inference engine 106 can utilize an associative model to connect data. In the associative model, all the fields in the data model have a logical association with every other field in the data model. An example data model 301 is shown in FIG. 3. The data model 301 illustrates connections between a plurality of tables which represent logical associations. Depending on the amount of data, the data model 301 can be too large to be loaded into memory. To address this issue, the logical inference engine 106 can generate one or more indexes for the data model. The one or more indexes can be loaded into memory in lieu of the data model 301. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Queries that compare for equality to a string can retrieve values very fast using a hash index. For instance, referring to the tables of FIG. 2, a query of SELECT*FROM Table 2 WHERE Client='Kalle') could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row. Disclosed are methods and systems that enable not only efficient processing of single queries, but also one or more batches of queries.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

Based on current selections and possible rows in data tables a calculation/chart engine 108 can calculate aggregations in objects forming transient hyper cubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

Figure 4:
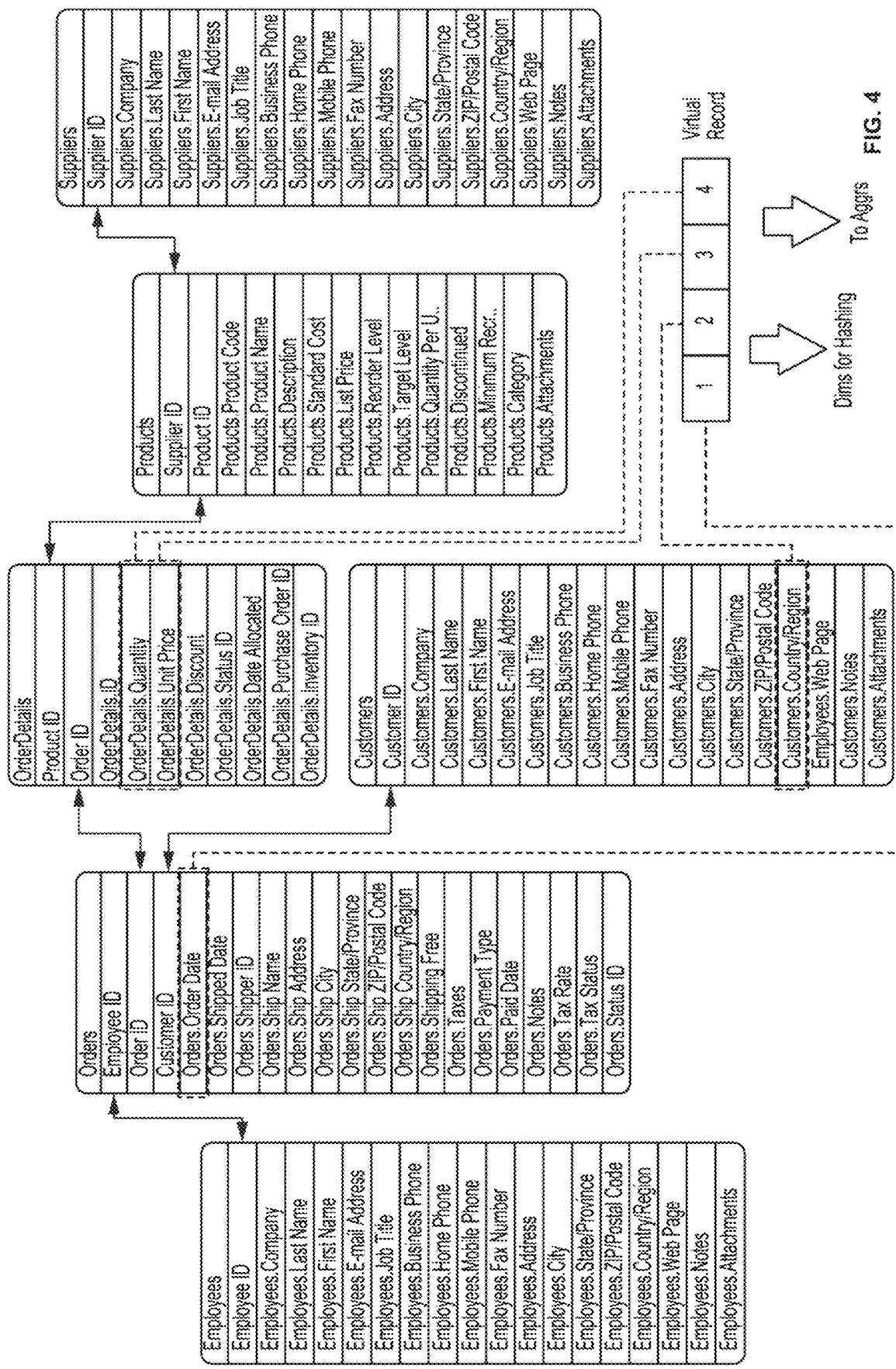
FIG. 4 shows an example data model.

In an aspect, the chart engine 108 can receive dimensions, expressions, and sorting parameters and can compute a hypercube data structure containing aggregations along the dimensions. For example, a virtual record can be built with a placeholder for all field values (or indices) needed, as a latch memory location. When all values are assigned, the virtual record can be processed to aggregate the fields needed for computations and save the dimension values in a data structure per row of the resulting hypercube. In such a way, the traversal of the database can be done in an arbitrary way, just depending on requirements provided by memory consumption and indexing techniques used for the particular case at hand. An example virtual record is shown in FIG. 4. This example considers the dimensions Order Date and Country/Region and the expression sum(Unit Price*Quantity).

Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 112 can comprise, for example, an Application Programming Interface (API). The interface 112 may be accessible by the user device 105 via the public cloud 103. That is, the interface 112 may be hosted/managed by the SaaS platform. The user of the user device 105 may use the interface 112 to access and/or interact with the associative data indexing engine 100. The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprise births there can be timestamps of the births and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc.) based on selections/calculations. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Different export features or tools 118 can be used to publish, export or deploy any output of the associative data indexing engine 100. Such output can be any form of visual representation, including, but not limited to, textual, graphical, animation, audio, tactile, and the like.

As described previously with regard to FIG. 1, the logical inference engine 106 can generate one or more indexes for the data model. The one or more indexes can be loaded into memory in lieu of the data model 301 shown in FIG. 3. As further shown in FIG. 3, the logical inference engine 106 can be configured for generating one or more bidirectional table indexes (BTI) 302a, 302b, 302c, 302d, and/or 302e and one or more bidirectional associative indexes (BAI) 303a, 303b, 303c and/or 303d based on a data model 301. The logical inference engine 106 can scan each table in the data model 301 and create the BTI 302a, 302b, 302c, 302d, and/or 302e. A BTI can be created for each column of each table in the data. The BTI 302a, 302b, 302c, 302d, and/or 302e can comprise a hash index. The BTI 302a, 302b, 302c, 302d, and/or 302e can comprise first attributes and pointers to the table rows comprising the first attributes. For example, referring to the tables of FIG. 2, an example BTI 302a can comprise "Kalle=>0x29838", where Kalle is an attribute found in Table 2 and 0x29838 is a reference to the row in Table 2 where Kalle is stored in memory. Thus, the BTI 302a, 302b, 302c, 302d, and/or 302e can be used to determine other attributes in other columns (e.g., second attributes, third attributes, etc.) in table rows comprising the first attributes. Accordingly, the BTI can be used to determine that an association exists between the first attributes and the other attributes.

The logical inference engine 106 can scan one or more of BTI 302a, 302b, 302c, 302d, and/or 302e and create the BAI 303a, 303b, 303c and/or 303d. The BAI 303a, 303b, 303c and/or 303d can comprise a hash index. The BAI 303a, 303b, 303c and/or 303d can comprise an index configured for connecting attributes in a first table to common columns in a second table. The BAI 303a, 303b, 303c and/or 303d thus allows for identification of rows in the second table which then permits identification of other attributes in other tables. For example, referring to the tables of FIG. 2, an example BAI 303a can comprise "Kalle=>0x39838", where Kalle is an attribute found in Table 2 and 0x39838 is a reference to a row in Table 4 that contains Kalle. In an aspect, the reference can be to a hash that can be in-memory or on disk.

Using the BTI 302a, 302b, 302c, 302d, and/or 302e and the BAI 303a, 303b, 303c, and/or 303d, the logical inference engine 106 can generate an index window 304 by taking a portion of the data model 301 and mapping it into memory. The portion of the data model 301 taken into memory can be sequential (e.g., not random). The result is a significant reduction in the size of data required to be loaded into memory.

In an aspect, bidirectional indexing using BTIs can have limits as to how much parallelization can be applied when processing the data model 301. To improve parallelization applied to the data model 301, the logical inference engine 106 can generate bidirectional indexes for partitions for a table in the data model 301. Such bidirectional indexes are hereinafter referred to as "indexlets," and the partitions for the table corresponding to an indexlet can be referred to as a "datalet." In an aspect, the logical inference engine 106 can generate indexlets for a given table by partitioning the table into blocks of rows (e.g., datalets). In an aspect, the blocks of rows can be of a same size. In an aspect, a last block of rows can be of a size less than the remaining blocks of rows. In an aspect, after partitioning the blocks of rows, the logical inference engine can generate an indexlet for each of the blocks of rows (e.g., datalets). In an aspect, generating an indexlet for a given block of rows (e.g., datalets) comprises generating a bidirectional index as described above, but limited in scope to the given block of rows (e.g., datalet). An indexlet is the smallest computational unit using a single BTI. BTI's can be used globally, but such global usage impairs scale-out possibilities. Using indexlets thus ensures scalability and distributed use of BTI's.

Figure 5:
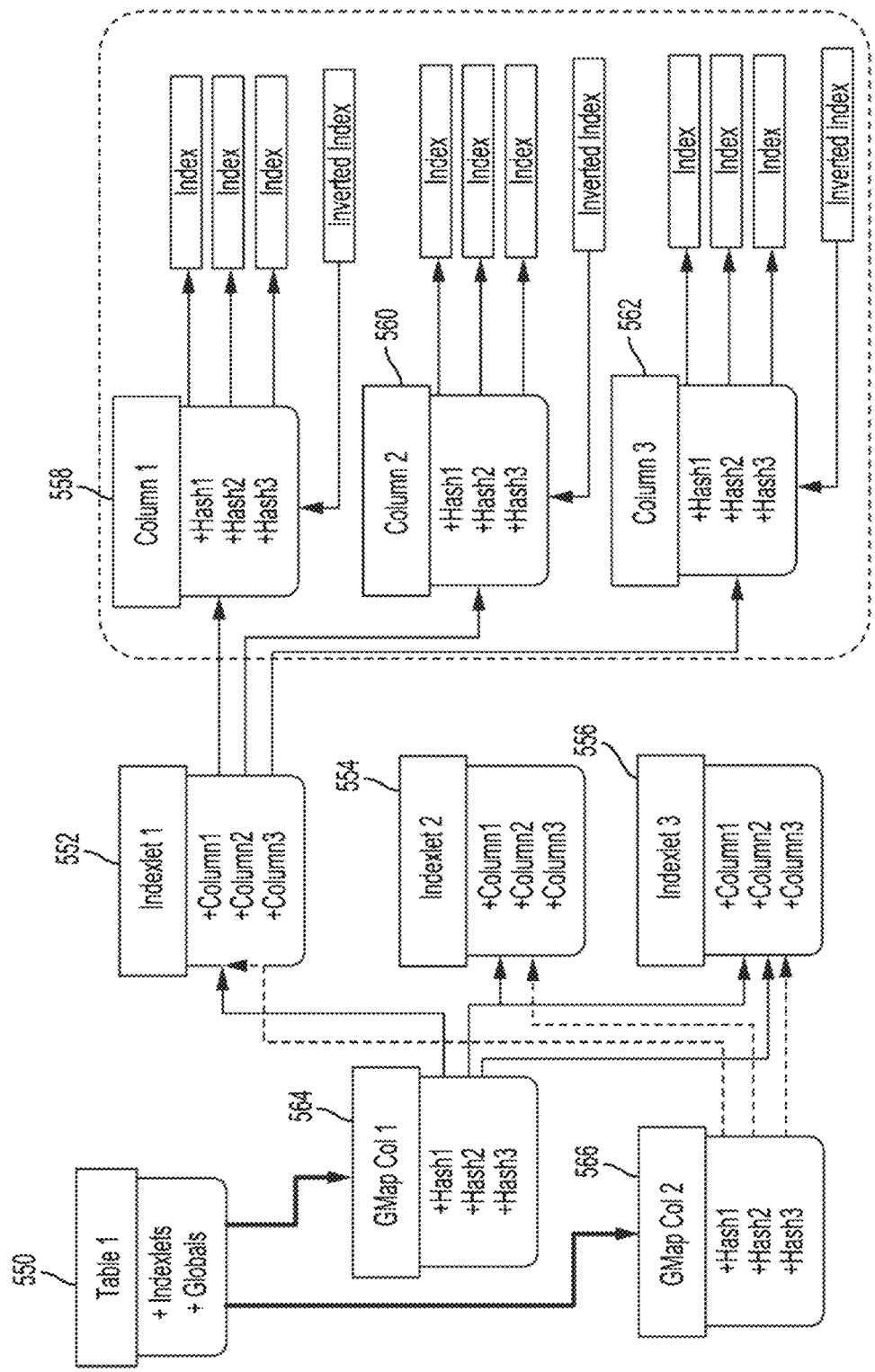
FIG. 5 shows an example data model.
Figure 6:
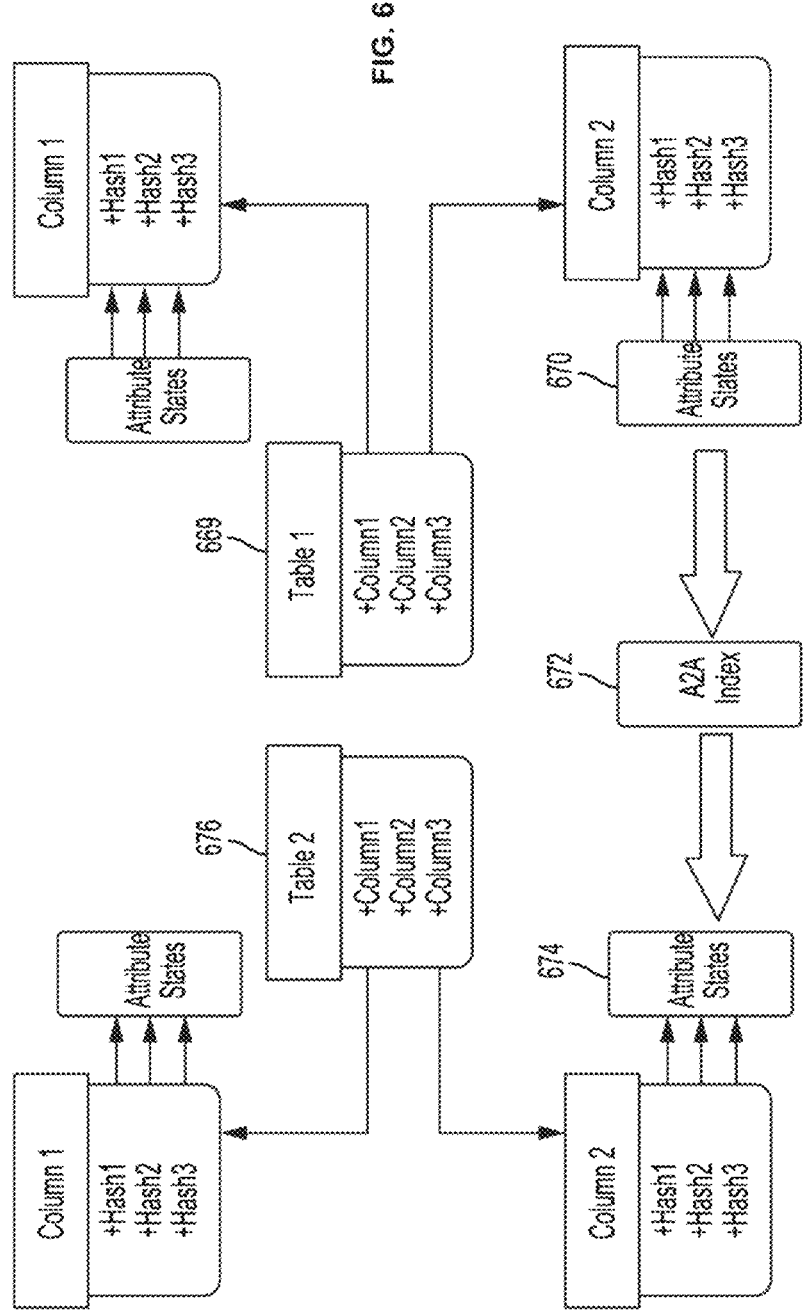
FIG. 6 shows an example data model.

A representation of a data structure for indexlets is shown in FIG. 5. Rows of a given table 550 can be divided into datalets bidirectionally indexed by indexlets 552, 554 and 556, respectively. In the example of FIG. 5, the indexlet 552 can include pointers or references to respective columns 558, 560, and 562 as set forth above with respect to bidirectional table indexes. Each of the indexlets 552, 554, and 556 are logically associated with bidirectional global attribute lists 564 and 566 that index a particular attribute to the blocks it is present in. Accordingly, an entry in the bidirectional global attribute list 564 and 566 for a given attribute can comprise a reference to an indexlet corresponding to a block having the respective attribute. In an aspect, the reference can include a hash reference. In an aspect, as shown in FIG. 6, an implicit relationship exists between indexlets in different tables through a common field present in both tables and an attribute-to-attribute (A2A) index 672.

Figure 7:
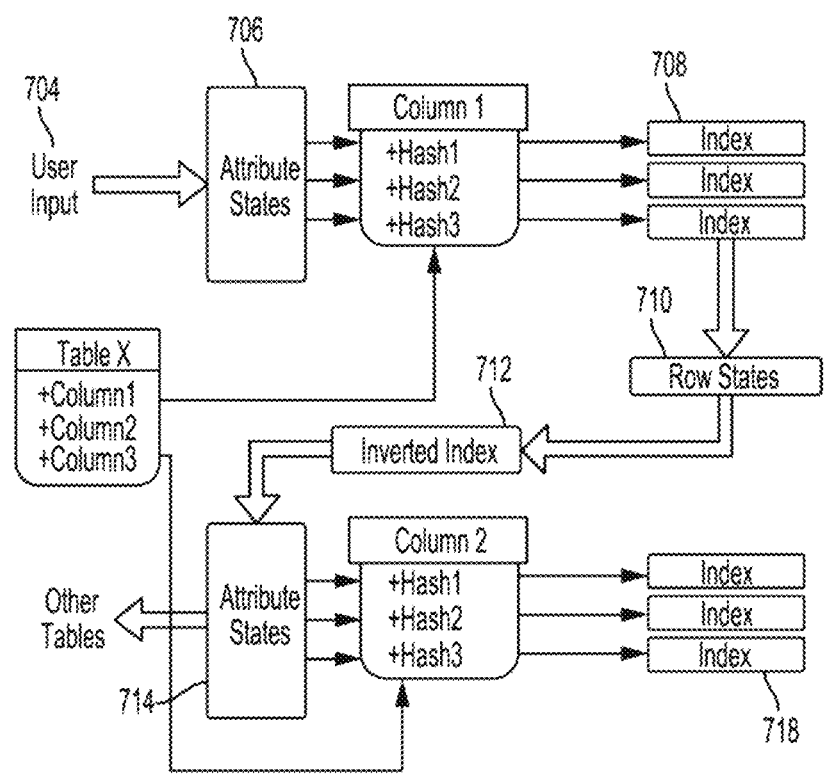
FIG. 7 shows an example data model.
Figure 8:
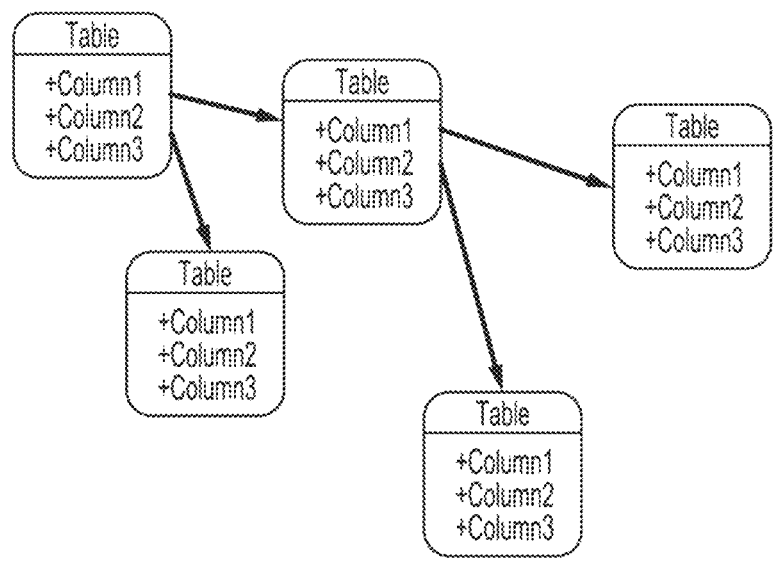
FIG. 8 shows an example data model.
Figure 19:
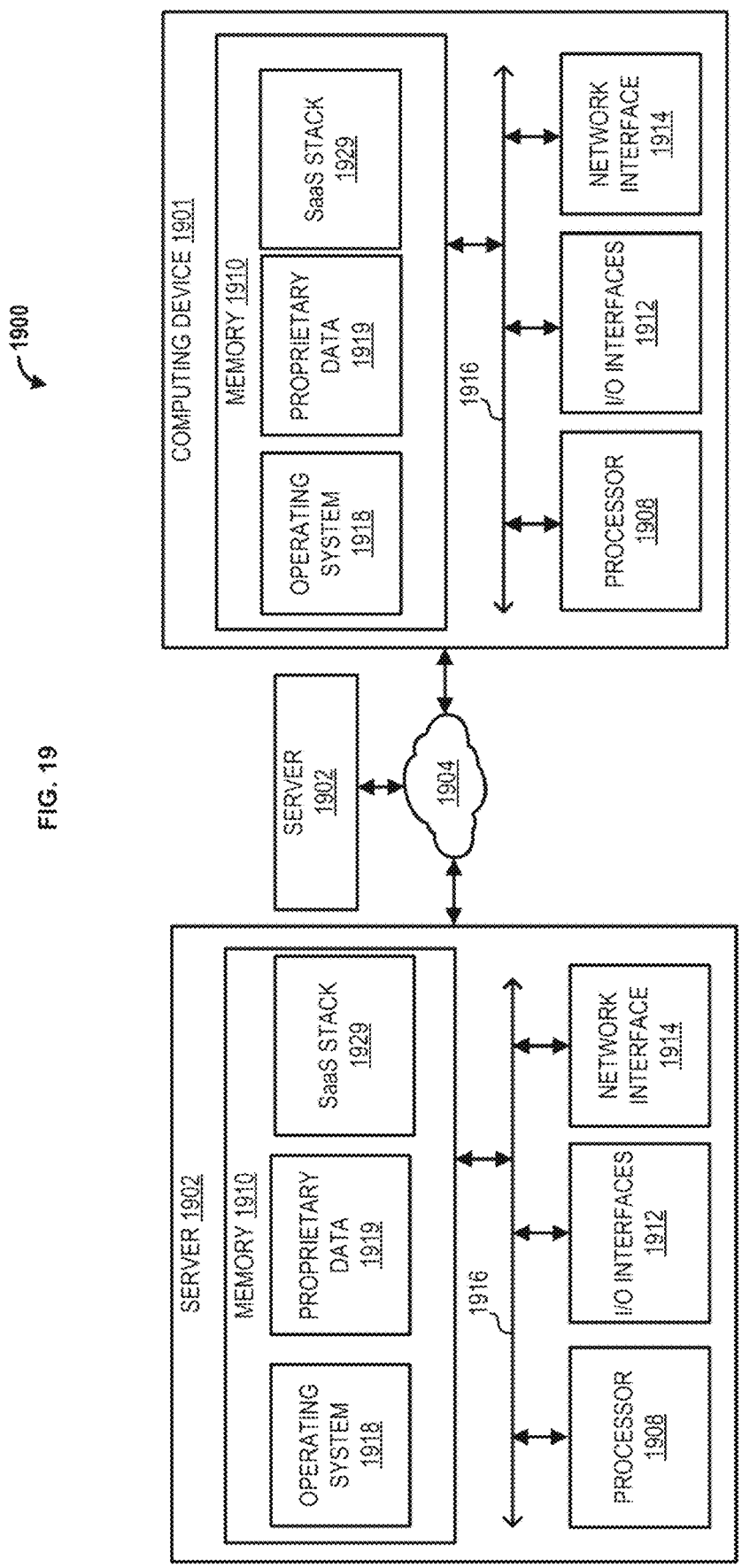
FIG. 19 shows an example system.

FIG. 7 illustrates an example application of one or more BTIs. User input 704 can be received that impacts a selection of one or more attribute states 706. Attribute states 706 can correspond to selection by a user of one or more attributes (e.g., values) found in Column 1 of Table X. In an aspect, the one or more attributes of Table X can comprise a hash of each respective attribute. One or more BTI's 708 can be accessed to determine one or more rows in Table X that comprise the attributes selected by the user. Row states 710 can correspond to selection of one or more rows found in Table X that comprise the one or more selected attributes. An inverted index 712 of Column 2 can be accessed to identify which rows of Table 1 comprise associated attributes. Attribute states 714 for Column 2 can be updated to reflect the associated attributes of Column 2. One or more BTI's 718 can be further accessed to determine other associated attributes in other columns as needed. Attribute states 714 can be applied to other tables via one or more BAIs. FIG. 19 illustrates an example of relationships identified by one or more BAIs.

Figure 9:
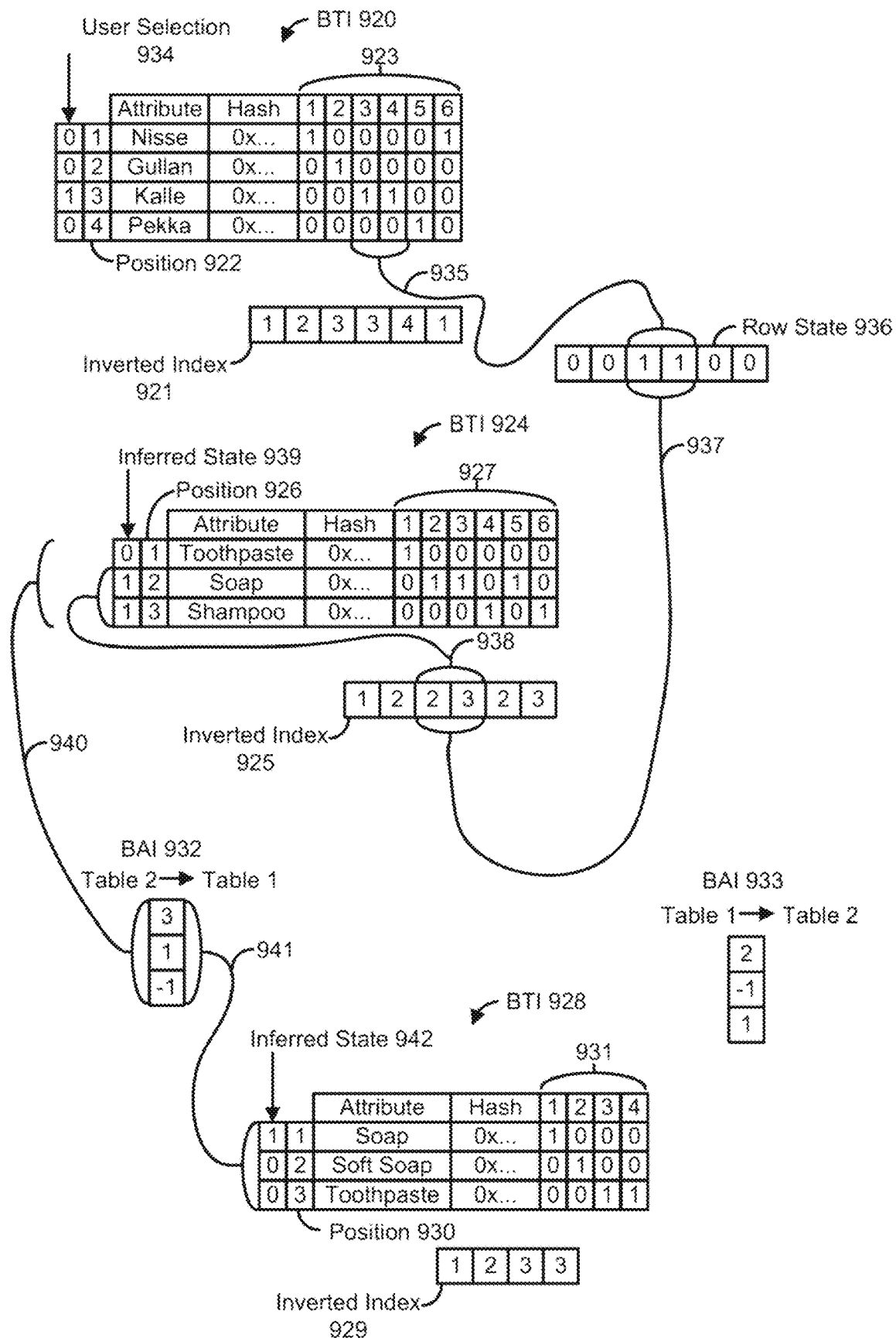
FIG. 9 shows an example data model.
Figure 10:
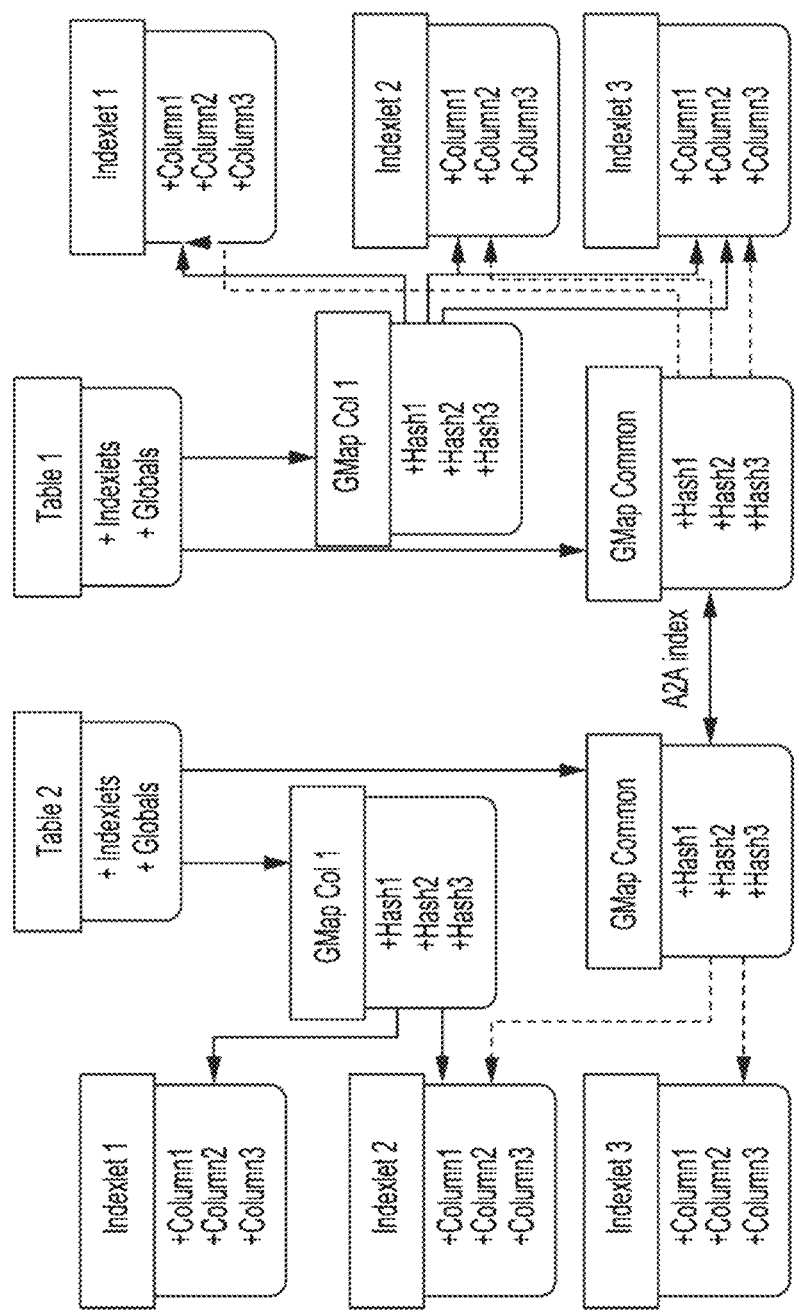
FIG. 10 shows an example data model.

FIG. 9 illustrates an example application of BTI's and BAI's to determine inferred states both inter-table and intra-table using Table 1 and Table 2 of FIG. 2. A BTI 920 can be generated for the "Client" attribute of Table 2. In an aspect, the BTI 920 can comprise an inverted index 913. In other aspect, the inverted index 913 can be considered a separate structure. The BTI 920 can comprise a row for each unique attribute in the "Client" column of Table 2. Each unique attribute can be assigned a corresponding position 922 in the BTI 920. In an aspect, the BTI 920 can comprise a hash for each unique attribute. The BTI 920 can comprise a column 923 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 920 reflects that the attribute "Nisse" is found in rows 1 and 6 of Table 2, the attribute "Gullan" is found in row 2 of Table 2, the attribute "Kalle" is found in rows 3 and 4 of Table 2, and the attribute "Pekka" is found in row 5 of Table 2.

The inverted index 913 can be generated such that each position in the inverted index 913 corresponds to a row of Table 2 (e.g., first position corresponds to row 1, second position corresponds to row 2, etc.). A value can be entered into each position that reflects the corresponding position 922 for each attribute. Thus, in the inverted index 913, position 1 comprises the value "1" which is the corresponding position 922 value for the attribute "Nisse", position 2 comprises the value "2" which is the corresponding position 922 value for the attribute "Gullan", position 3 comprises the value "3" which is the corresponding position 922 value for the attribute "Kalle", position 4 comprises the value "3" which is the corresponding position 922 value for the attribute "Kalle", position 5 comprises the value "4" which is the corresponding position 922 value for the attribute "Pekka", and position 6 comprises the value "1" which is the corresponding position 922 value for the attribute "Nisse".

A BTI 924 can be generated for the "Product" attribute of Table 2. In an aspect, the BTI 924 can comprise an inverted index 925. In other aspect, the inverted index 925 can be considered a separate structure. The BTI 924 can comprise a row for each unique attribute in the "Product" column of Table 2. Each unique attribute can be assigned a corresponding position 926 in the BTI 924. In an aspect, the BTI 924 can comprise a hash for each unique attribute. The BTI 924 can comprise a column 927 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 924 reflects that the attribute "Toothpaste" is found in row 1 of Table 2, the attribute "Soap" is found in rows 2, 3, and 5 of Table 2, and the attribute "Shampoo" is found in rows 4 and 6 of Table 2.

By way of example, the inverted index 925 can be generated such that each position in the inverted index 925 corresponds to a row of Table 2 (e.g., first position corresponds to row 1, second position corresponds to row 2, etc.). A value can be entered into each position that reflects the corresponding position 926 for each attribute. Thus, in the inverted index 925, position 1 comprises the value "1" which is the corresponding position 926 value for the attribute "Toothpaste", position 2 comprises the value "2" which is the corresponding position 926 value for the attribute "Soap", position 3 comprises the value "2" which is the corresponding position 926 value for the attribute "Soap", position 4 comprises the value "3" which is the corresponding position 926 value for the attribute "Shampoo", position 5 comprises the value "2" which is the corresponding position 926 value for the attribute "Soap", and position 6 comprises the value "3" which is the corresponding position 926 value for the attribute "Shampoo".

By way of example, a BTI 928 can be generated for the "Product" attribute of Table 1. In an aspect, the BTI 928 can comprise an inverted index 929. In other aspect, the inverted index 929 can be considered a separate structure. The BTI 928 can comprise a row for each unique attribute in the "Product" column of Table 1. Each unique attribute can be assigned a corresponding position 930 in the BTI 928. In an aspect, the BTI 928 can comprise a hash for each unique attribute. The BTI 928 can comprise a column 931 for each row of Table 1. For each attribute, a "1" can indicate the presence of the attribute in the row and a "0" can indicate an absence of the attribute from the row. "0" and "1" are merely examples of values used to indicate presence or absence. Thus, the BTI 928 reflects that the attribute "Soap" is found in row 1 of Table 1, the attribute "Soft Soap" is found in row 2 of Table 1, and the attribute "Toothpaste" is found in rows 3 and 4 of Table 1.

By way of example, the inverted index 929 can be generated such that each position in the inverted index 929 corresponds to a row of Table 1 (e.g., first position corresponds to row 1, second position corresponds to row 2, etc.). A value can be entered into each position that reflects the corresponding position 930 for each attribute. Thus, in the inverted index 929, position 1 comprises the value "1" which is the corresponding position 930 value for the attribute "Soap", position 2 comprises the value "2" which is the corresponding position 930 value for the attribute "Soft Soap", position 3 comprises the value "3" which is the corresponding position 930 value for the attribute "Toothpaste", and position 4 comprises the value "3" which is the corresponding position 930 value for the attribute "Toothpaste".

By way of example, a BAI 932 can be generated as an index between the product attribute of Table 2 and Table 1. The BAI 932 can comprise a row for each unique attribute in the BTI 924 by order of corresponding position 926. The value in each row can comprise the corresponding position 930 of the BTI 928. Thus, position 1 of the BAI 932 corresponds to "Toothpaste" in the BTI 924 (corresponding position 926 of 1) and comprises the value "3" which is the corresponding position 930 for "Toothpaste" of the BTI 928. Position 2 of the BAI 932 corresponds to "Soap" in the BTI 924 (corresponding position 926 of 2) and comprises the value "1" which is the corresponding position 930 for "Soap" of the BTI 928. Position 3 of the BAI 932 corresponds to "Shampoo" in the BTI 924 (corresponding position 926 of 3) and comprises the value "−1" which indicates that the attribute "Shampoo" is not found in Table 1.

By way of example, a BAI 933 can be created to create an index between the product attribute of Table 1 and Table 2. The BAI 933 can comprise a row for each unique attribute in the BTI 928 by order of corresponding position 930. The value in each row can comprise the corresponding position 926 of the BTI 924. Thus, position 1 of the BAI 933 corresponds to "Soap" in the BTI 928 (corresponding position 930 of 1) and comprises the value "2" which is the corresponding position 926 for "Soap" of the BTI 924. Position 2 of the BAI 933 corresponds to "Soft Soap" in the BTI 928 (corresponding position 930 of 2) and comprises the value "−1" which indicates that the attribute "Soft Soap" is not found in Table 2. Position 3 of the BAI 933 corresponds to "Toothpaste" in the BTI 928 (corresponding position 930 of 3) and comprises the value "1" which is the corresponding position 926 for "Toothpaste" of the BTI 924.

FIG. 9 illustrates an example application of the logical inference engine 106 utilizing the BTI 920, the BTI 924, and the BTI 928. A user can select the "Client" "Kalle" from within a user interface. A column for a user selection 934 of "Kalle" can be indicated in the BTI 920 comprising a value for each attribute that reflects the selection status of the attribute. Thus, the user selection 934 comprises a value of "0" for the attribute "Nisse" indicating that "Nisse" is not selected, the user selection 934 comprises a value of "0" for the attribute "Gullan" indicating that "Gullan" is not selected, the user selection 934 comprises a value of "1" for the attribute "Kalle" indicating that "Kalle" is selected, and the user selection 934 comprises a value of "0" for the attribute "Pekka" indicating that "Pekka" is not selected.

The BTI 920 can be consulted to determine that the attribute "Kalle" has a value of "1" in the column 923 corresponding to rows 3 and 4. In an aspect, the inverted index 913 can be consulted to determine that the user selection 934 relates to the position 922 value of "3" which is found in the inverted index 913 at positions 3 and 4, implicating rows 3 and 4 of Table 1. Following path 935, a row state 936 can be generated to reflect the user selection 934 as applied to the rows of Table 2. The row state 936 can comprise a position that corresponds to each row and a value in each position reflecting whether a row was selected. Thus, position 1 of the row state 936 comprises the value "0" indicating that row 1 does not contain "Kalle", position 2 of the row state 936 comprises the value "0" indicating that row 2 does not contain "Kalle", position 3 of the row state 936 comprises the value "1" indicating that row 3 does contain "Kalle", position 4 of the row state 936 comprises the value "1" indicating that row 4 does contain "Kalle", position 5 of the row state 936 comprises the value "0" indicating that row 5 does not contain "Kalle", and position 6 of the row state 936 comprises the value "0" indicating that row 6 does not contain "Kalle".

Following path 937, the row state 936 can be compared with the inverted index 925 to determine the corresponding position 926 contained in the inverted index 925 at positions 3 and 4. The inverted index 925 comprises the corresponding position 926 value of "2" in position 3 and the corresponding position 926 value of "3" in position 4. Following path 938, the corresponding position 926 values of "2" and "3" can be determined to correspond to "Soap" and "Shampoo" respectively in the BTI 924. Thus, the logical inference engine 106 can determine that both "Soap" and "Shampoo" in Table 2 are associated with "Kalle" in Table 2. The association can be reflected in an inferred state 939 in the BTI 924. The inferred state 939 can comprise a column with a row for each attribute in the BTI 924. The column can comprise a value indicated the selection state for each attribute. The inferred state 939 comprises a "0" for "Toothpaste" indicating that "Toothpaste" is not associated with "Kalle", the inferred state 939 comprises a "1" for "Soap" indicating that "Soap" is associated with "Kalle", and inferred state 939 comprises a "1" for "Shampoo" indicating that "Shampoo" is associated with "Kalle".

Following path 940, the inferred state 939 can be compared to the BAI 932 to determine one or more associations between the selection of "Kalle" in Table 2 and one or more attributes in Table 1. As the inferred state 939 comprises a value of "1" in both position 2 and position 3, the BAI 932 can be assessed to determine the values contained in position 2 and position 3 of the BAI 932 (following path 941). Position 2 of the BAI 932 comprises the value "1" which identifies the corresponding position 930 of "Soap" and position 3 of the BAI 932 comprises the value "−1" which indicates that Table 1 does not contain "Shampoo". Thus, the logical inference engine 106 can determine that "Soap" in Table 1 is associated with "Kalle" in Table 2. The association can be reflected in an inferred state 942 in the BTI 928. The inferred state 942 can comprise a column with a row for each attribute in the BTI 928. The column can comprise a value indicated the selection state for each attribute. The inferred state 942 comprises a "1" for "Soap" indicating that "Soap" is associated with "Kalle", the inferred state 942 comprises a "0" for "Soft Soap" indicating that "Soft Soap" is not associated with "Kalle", and the inferred state 942 comprises a "0" for "Toothpaste" indicating that "Toothpaste" is not associated with "Kalle". Based on the current state of BTIs and BAIs, if the data sources 102 indicate that an update or delta change has occurred to the underlying data, the BTIs and BAIs can be updated with corresponding changes to maintain consistency.

In aspects implementing indexlets, the logical inference engine 106 can apply query language by first performing intra-table inferencing on respective tables. Intra-table inferencing comprises transferring the imposed state of one field to other fields within the same table. In an aspect, shown in FIG. 7, intra-table inferencing can comprise computing the union of the index of the active attributes in a user input 704. The intersection of the result of the union operation and record states (e.g., row states 710) is then determined. This result is then intersected with the attribute states 714 of other columns using the inverted index 712. If other selection vectors from a previously provided user input vector 704 has zero active entries, a conflict can be detected. In an aspect, the logical inference engine 106 can resolve the detected conflict. In an aspect, resolving a conflict can include deleting or otherwise eliminating one or more incompatible selections. In another aspect, resolving a conflict can include reverting the data model 301 or a portion of the data model 301, e.g. a table, record, or attribute, to a previous state.

In an aspect, after performing intra-table inferencing, the logical inference engine 106 can perform inter-table inferencing based on the intra-table inferencing output of a plurality of tables, as is depicted in FIG. 6. In an aspect, intra-table inferencing can include transferring a common field attribute of one table 669 to a child in its branch. In an aspect, this can be performed by running the attribute states 670 output from intra-table inferencing through an attribute-to-attribute (A2A) index 672 referencing the attribute states 674 in a second table 676. In an aspect, the A2A index 672 can be partitioned into one or more indexlets as described herein with respect to other data tables. In another aspect, transferring a common field attribute of one table 669 to a child in its branch by running the attribute states 670 output from intra-table inferencing through a function or logic performing similar functionality as the A2A index 672. For example, a function, service, or other logic can accept as input a pair of symbols and return an indication of whether or not they are related, e.g. TRUE or FALSE. In another aspect, attribute-to-attribute relations can be indicated by user input.

Figure 11:
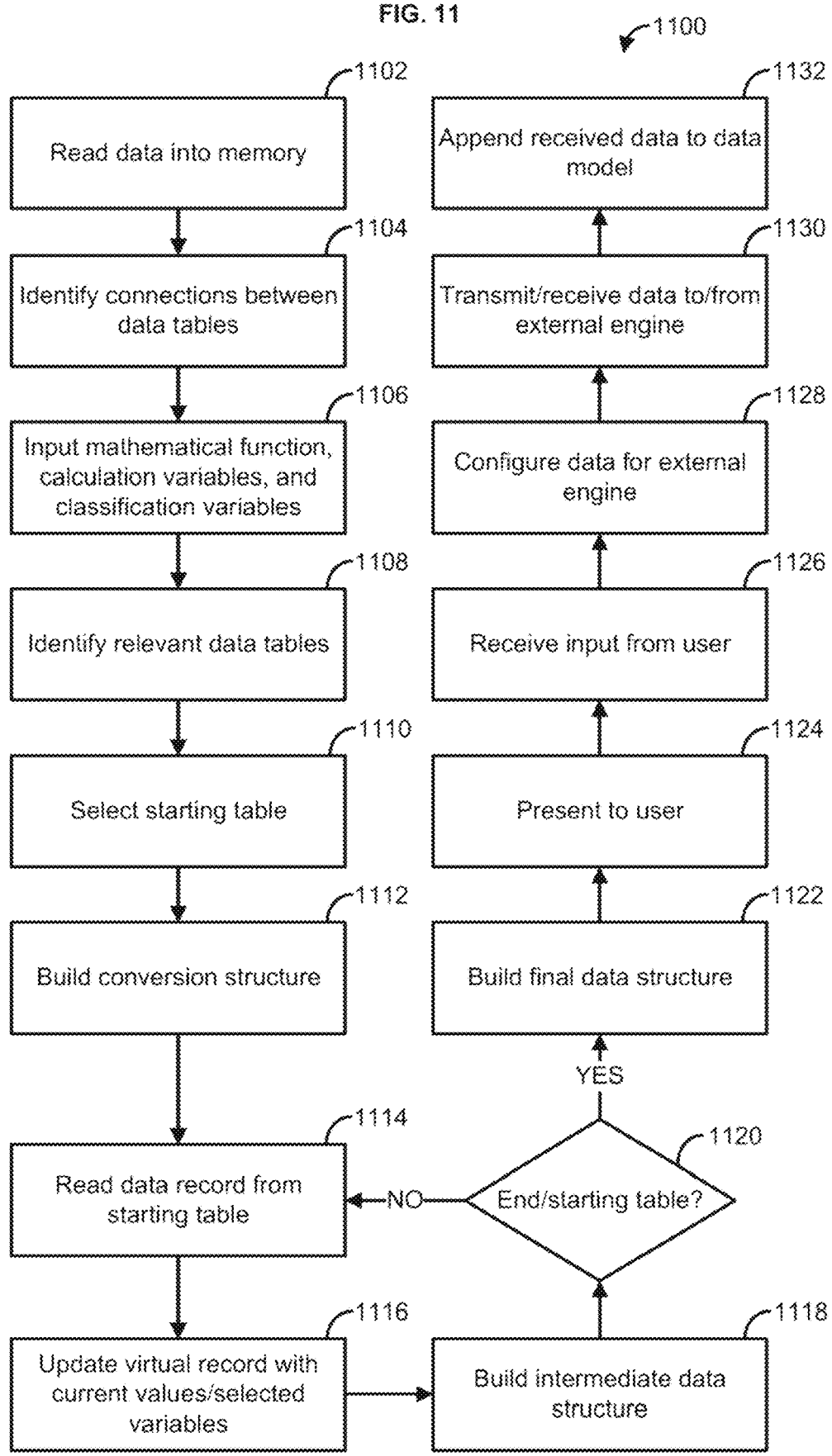
FIG. 11 shows an example process flowchart.

The associative data indexing engine 100 may execute one or more steps illustrated in a method 1100 shown in FIG. 11. In step 1102, the program can read some or all data records in a database, for instance using a SELECT statement which selects all the tables of the database, e.g. Tables 1-5 of FIG. 2. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the method 1100 can analyze the database in a step 1104 to identify all connections between the data tables. A connection between two data tables means that these data tables have one variable in common. In an aspect, step 1104 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database. In doing so, the user defines in step 1106 a mathematical function, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

The method 1100 then identifies in step 1108 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 1108.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in step 1110, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in step 1112. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999-01-12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in step 1114 from the starting table (Table 2). Then, the value of each selected variable ("Client", "Number") in the current data record of the starting table can be incorporated in the virtual data record in a step 1116. Also, by using the conversion structure each value of each connecting variable ("Date", "Product") in the current data record of the starting table can be converted into a value of a corresponding selected variable ("Year", "Price"), this value also being incorporated in the virtual data record.

In step 1118 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 1120 it can be checked whether the end of the starting table has been reached. If not, the process can be repeated from step 1114 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube, as shown in non-binary notation in Table 6 of FIG. 12, can be created in a step 1122 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in step 1124, as shown in Table 7 of FIG. 12. Alternatively, if the final data structure contains many dimensions, the data can be presented in a pivot table, in which the user can interactively move up and down in dimensions, as is well known in the art.

In an aspect, step 1122 can involve any of the processes described herein as part of a process for creating the hypercube/multidimensional cube. For example, output from the logical inference engine 106 utilizing one or more BTIs and or one or more A2A indexes can be used in creation of the hypercube/multidimensional cube. When a user makes a selection, the logical inference engine 106 calculates a data subset of which one or more BTIs and/or A2A indexes can be generated and provided to the chart engine 108 for use in generating a hypercube/multidimensional cube and/or evaluating one or more expressions against a hypercube/multidimensional cube via one or more BTIs and/or A2A indexes as described herein.

At step 1126, input from the user can be received. For example, input form the user can be a selection and/or de-selection of the presented results. Optionally, input from the user at step 1126 can comprise a request for external processing. In an aspect, the user can be presented with an option to select one or more external engines to use for the external processing. Optionally, at step 1128, data underlying the user selection can be configured (e.g., formatted) for use by an external engine. Optionally, at step 1130, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at step 1132, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

Figure 13:
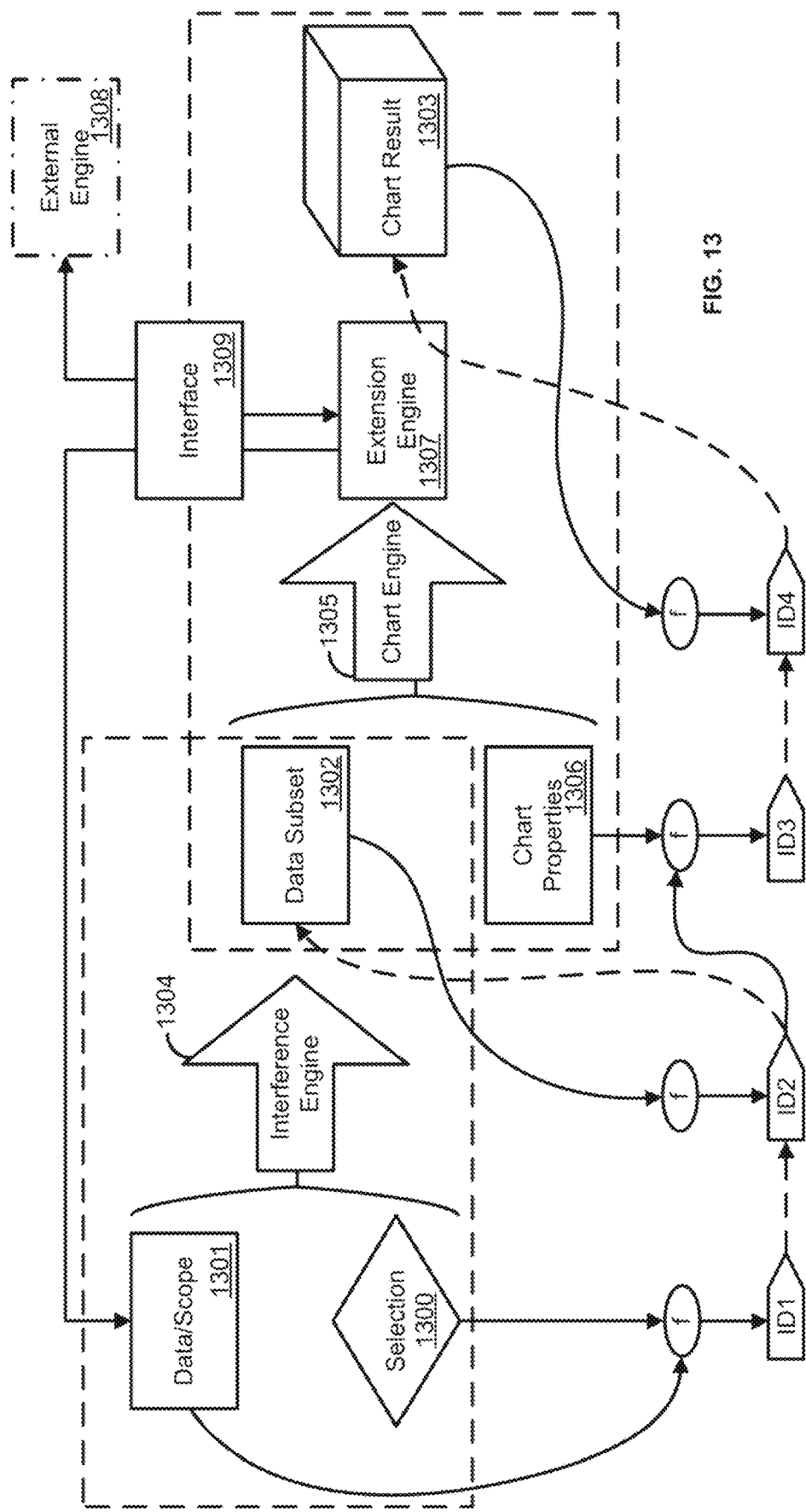
FIG. 13 shows an example process flowchart.

FIG. 13 illustrates how a selection 1300 operates on a scope 1301 of presented data to generate a data subset 1302. The data subset 1302 can form a state space, which is based on a selection state given by the selection 1300. In an aspect, the selection state (or "user state") can be defined by a user clicking on list boxes and graphs in a user interface of an application. An application can be designed to host a number of graphical objects (charts, tables, etc.) that evaluate one or more mathematical functions (also referred to as an "expression") on the data subset 1302 for one or more dimensions (classification variables). The result of this evaluation creates a chart result 1303 which can be a multidimensional cube which can be visualized in one or more of the graphical objects.

The application can permit a user to explore the scope 1301 by making different selections, by clicking on graphical objects to select variables, which causes the chart result 1303 to change. At every time instant during the exploration, there exists a current state space, which can be associated with a current selection state that is operated on the scope 1301 (which always remains the same).

As illustrated in FIG. 13, when a user makes a selection, the inference engine 1304 calculates a data subset. Also, an identifier ID1 for the selection together with the scope can be generated based on the filters in the selection and the scope. Subsequently, an identifier ID2 for the data subset is generated based on the data subset definition, for example a bit sequence that defines the content of the data subset. ID2 can be put into a cache using ID1 as a lookup identifier. Likewise, the data subset definition can be put in the cache using ID2 as a lookup identifier.

As shown in FIG. 13, a chart calculation in a calculation/chart engine 1305 takes place in a similar way. Here, there are two information sets: the data subset 1302 and relevant chart properties 1306. The latter can be, but not restricted to, a mathematical function together with calculation variables and classification variables (dimensions). Both of these information sets can be used to calculate the chart result 1303, and both of these information sets can be also used to generate identifier ID3 for the input to the chart calculation. ID2 can be generated already in the previous step, and ID3 can be generated as the first step in the chart calculation procedure.

The identifier ID3 can be formed from ID2 and the relevant chart properties. ID3 can be seen as an identifier for a specific chart generation instance, which can include all information needed to calculate a specific chart result. In addition, a chart result identifier ID4 can be created from the chart result definition, for example a bit sequence that defines the chart result 1303. ID4 can be put in the cache using ID3 as a lookup identifier. Likewise, the chart result definition can be put in the cache using ID4 as a lookup identifier.

Optionally, further calculations, transforming, and/or processing can be included through an extension engine 1307. Optionally, associated results from the inference engine 1304 and further computed by hypercube computation in said calculation/chart engine 1305 can be coupled to an external engine 1308 that can comprise one or more data processing applications (e.g., simulation applications, statistical applications, mathematical computation applications, database applications, combinations thereof, and the like). Context of a data model processed by the inference engine 1304 can comprise a tuple or tuples of values defined by dimensions and expressions computed by hypercube routines. Data can be exchanged through an interface 1309.

The associated results coupled to the external engine 1308 can be intermediate. Further results that can be final hypercube results can also be received from the external engine 1308. Further results can be fed back to be included in the Data/Scope 1301 and enrich the data model. The further results can also be rendered directly to the user in the chart result 1303. Data received from and computed by the external engine 1308 can be used for further associative discovery.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 14.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figure 14:
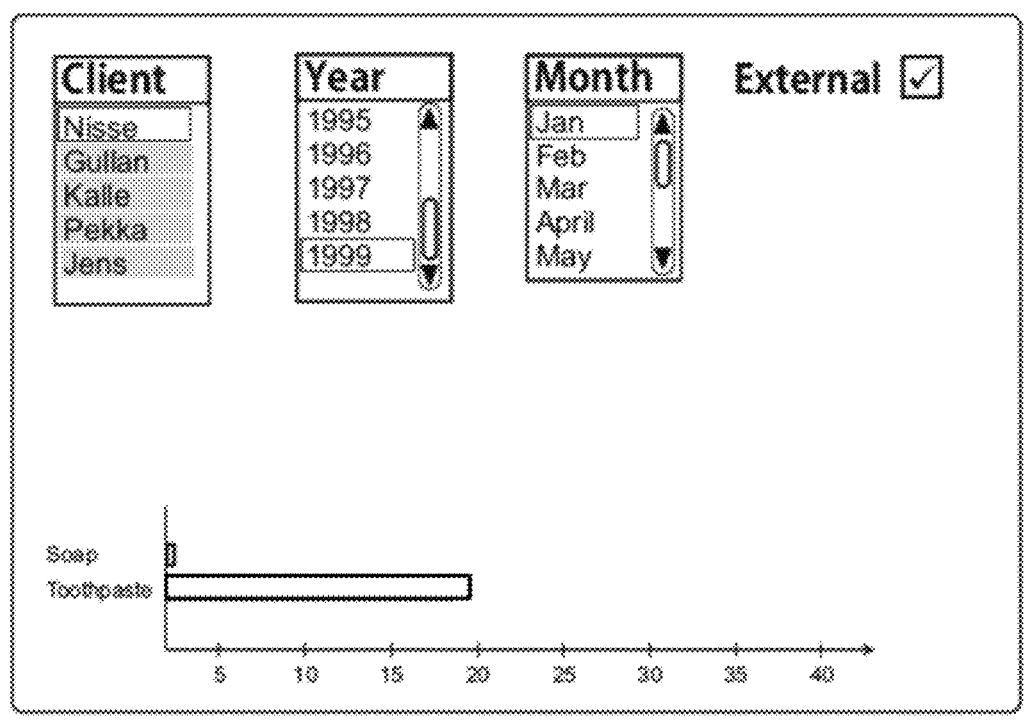
FIG. 14 shows an example interface.

The result of a standard query can be a smaller subset of the data within the database, or a result set, which is comprised of the records, and more specifically, the data element types and data element values within those records, along with any calculated functions, that match the specified query. For example, as indicated in FIG. 14, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way. Optionally, in this application, external processing can also be requested by ticking "External" in the user interface of FIG. 14.

Figure 15:
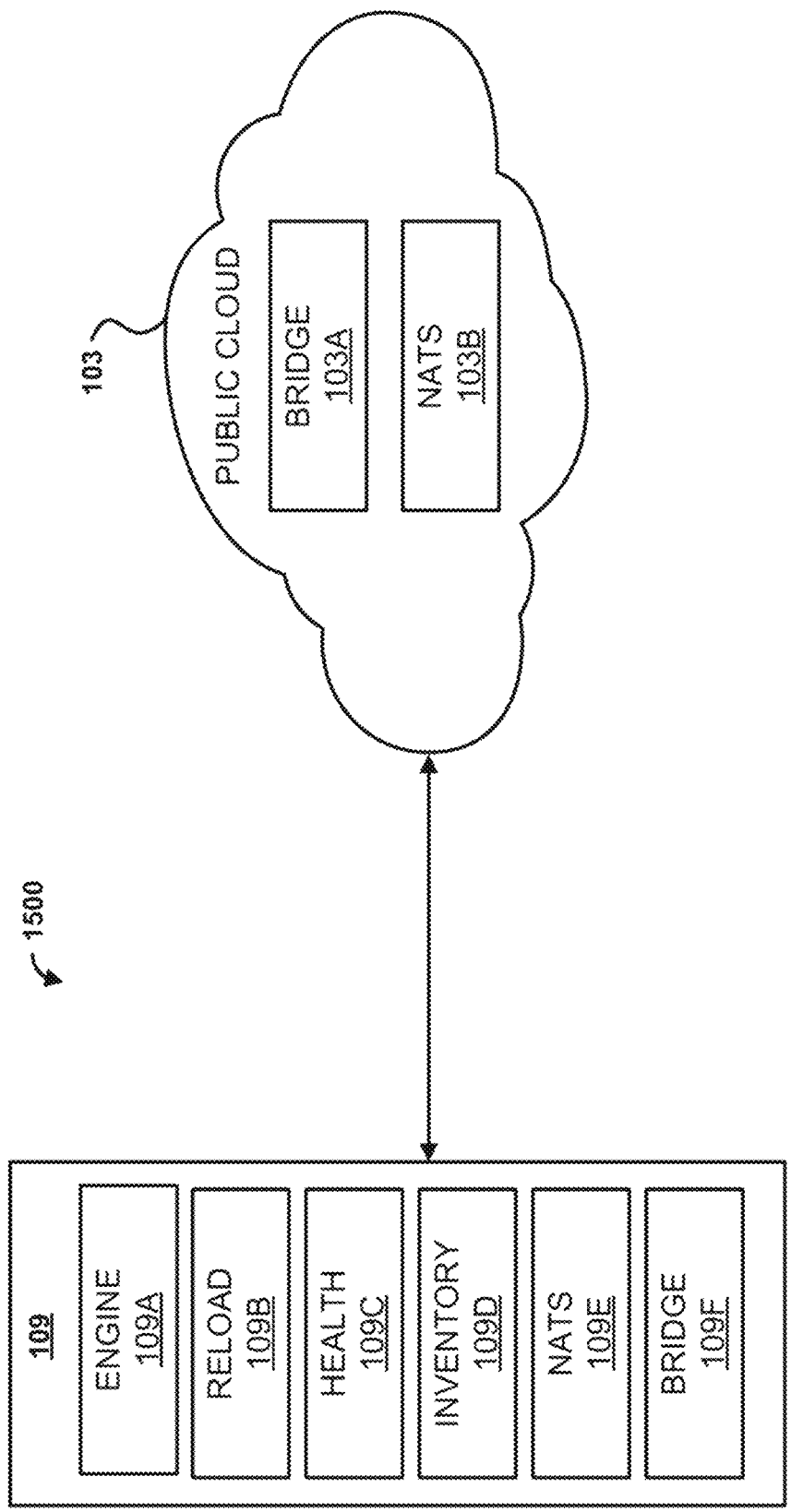
FIG. 15 shows an example system.

FIG. 15 shows an example system 1500 for improved analytics. As discussed herein, the control plane for the platform may reside in the public cloud 103, and the data plane for the platform may reside in the on-premises private cloud 113 (e.g., the forts 109, the one or more databases 111, and/or the analytics backend 107). The system 1500 shows example aspects of the forts 109 and the public cloud 103. While the system 1500 shows one fort 109, it is to be understood that the exemplary aspects described with respect to the fort 109 shown in the system 1500 may apply to all of the forts 109 described herein. As shown in FIG. 15, the fort 109 may comprise a bridge module 109F and the public cloud 103 may comprise a bridge module 103A. The bridge module 109F and the bridge module 103A may be used to establish a trusted connection between the fort 109 and the platform via the public cloud 103 using a verification process, a configuration file, a certificate, combinations thereof, and/or the like. The bridge module 109F and the bridge module 103A may be responsible for sending data from the fort's 109 Network Address Translation Service (NATS) 109E to the platform via the public cloud's 103 NATS 103B. For example, the bridge module 109F and the bridge module 103A may send/receive messages/data via the respective NATS 103B and 109E using Message Queuing Telemetry Transport (MQTT) over a WebSocket.

As shown in FIG. 15, the fort 109 may comprise a health module 109C. The health module 109C may send/receive messages/data to the fort's 109 NATS 109E to be forwarded by the fort's 109 bridge module 109F to the platform via the public cloud 103 to ensure communication between the fort 109 and the platform via the public cloud 103. The health module 109C may send usage and capacity metrics to the fort's 109 NATS 109E to be forwarded by the fort's 109 bridge module 109F to ensure proper load balancing and usage reporting is available in a management console of the platform (e.g., a part of the control plane of the SaaS platform). As also shown in FIG. 15, the fort 109 may comprise an inventory module 109D. The inventory module 109D may send data indicative of an inventory of applications, files, connections, and/or the like stored within the on-premises private cloud 113 to the fort's 109 NATS 109E to be forwarded by the fort's 109 bridge module 109F to the platform via the public cloud 103.

As discussed herein, the present methods and systems may ensure that all proprietary data remains within the private cloud 113 and never crosses into the public cloud 103, therefore guaranteeing a natural barrier between the data plane and the control plane of the SaaS platform. As described herein, each deployed fort 109 may be a local instance of the SaaS platform. For example, each deployed fort 109 may execute a local instance of the SaaS platform (e.g., the analytics backend 107) within an engine module 109A as described further below. As another example, components/modules of the analytics backend 107 may reside/execute at one or more other computing devices within the private cloud 113 with which each fort 109 may communicate. The analytics backend 107 may include software, applications, etc., of the SaaS platform that may be used for storing, managing, manipulating, and/or accessing the proprietary data housed in the one or more databases 111. The fort 109 may comprise a reload module 109B. The analytics backend 107 may interact with the reload module 109B to pull/retrieve/refresh the proprietary data housed in the one or more databases 111 (e.g., all within the private cloud 113).

Each of the forts 109 may include all of the necessary tools to provide the power of the SaaS platform, such as a complete analytics stack. The analytics stack (e.g., the analytics backend 107) may reside in the engine module 109A of the fort 109. The engine module 109A may comprise one or more components of the associative data indexing engine 100 shown in FIG. 1B. That is, as the fort 109 may be a local instance of the SaaS platform described herein, the engine module 109A may include all of the functionality described herein with respect to the one or more components of the associative data indexing engine 100. The data 102 shown in FIG. 1B may correspond to the one or more databases 111 within the private cloud 113. The engine module 109A may process queries, for example, in the same way as the associative data indexing engine 100.

To ensure proper functionality of the analytics stack at the forts 109, operational data and metadata relating to the proprietary data may pass between the data plane and control plane of the platform (e.g., transfer to/from the private cloud 113 and the public cloud 103). As noted herein, proprietary data (e.g., data related to the enterprise/organization) may remain within the private cloud 113. Additionally, event data containing private (e.g., customer) information may remain within the private cloud 113. Examples of operational data and metadata relating to the proprietary data that may pass to/from the private cloud 113 and the public cloud 103 may include one or more of the following: version details about the services running in the forts 109, logs and events related to the operation of the forts 109, status updates concerning the forts 109 (e.g., non-operational, critical error, etc.), service level indicator details, information about stale/outdated security keys, data indicating that a service update(s) is outstanding, or data indicating that a security patch(es) or a regular update(s) was successful or unsuccessful. The operational data and metadata may pass to/from the private cloud 113 and the public cloud 103 via the inventory module 109D, the NATS 109E, and/or the bridge module 109F of the fort 109.

Figure 16:
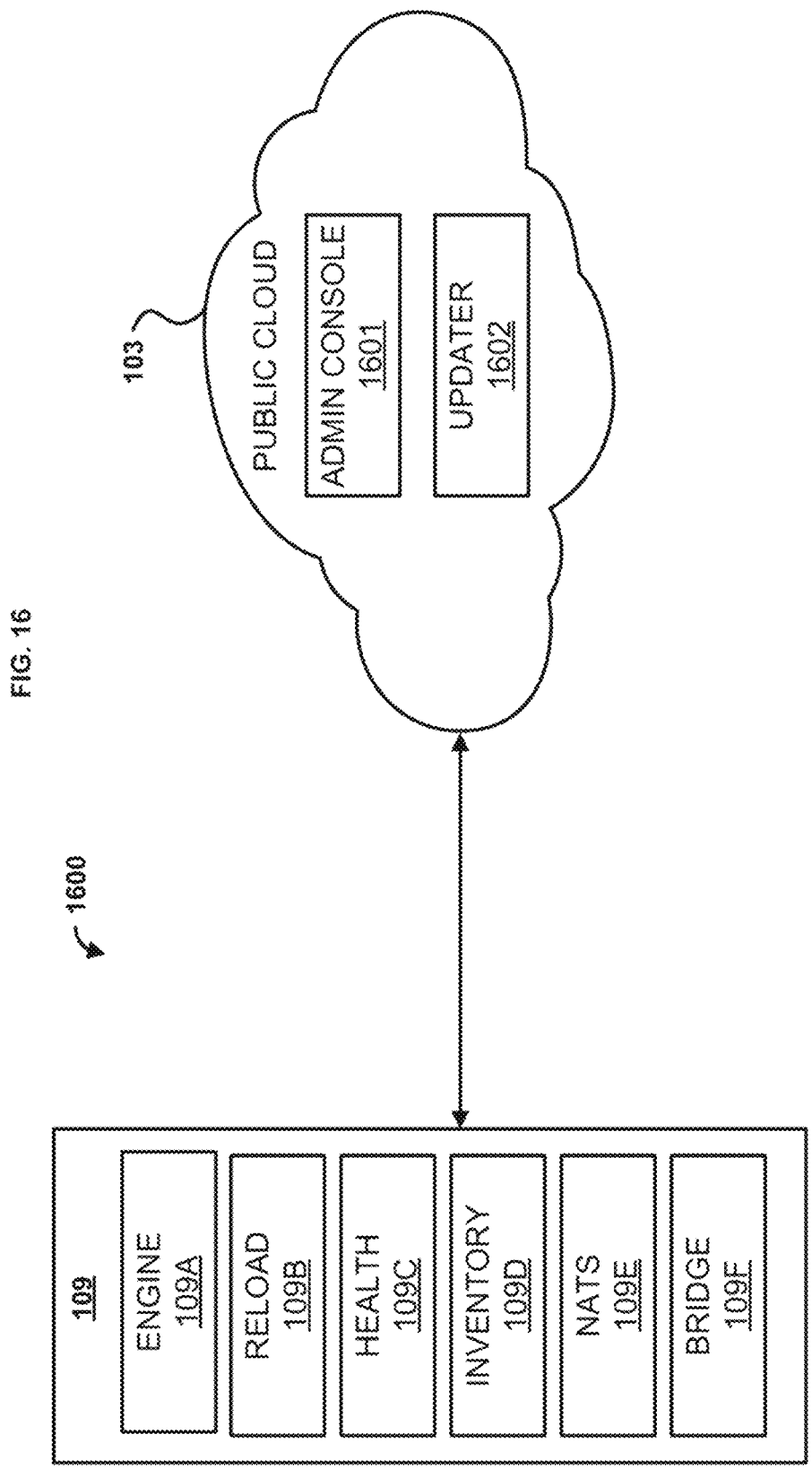
FIG. 16 shows an example system.

While each of the forts 109 may include all of the necessary tools to provide the power of the SaaS platform within the on-premises private cloud 103, some aspects of the platform (e.g., control plane elements) may remain within the public cloud 103. FIG. 16 shows an example system 1600. The system 1600 may include one of the forts 109 and aspects of the platform that reside within the public cloud 103. While the system 1600 shows one fort 109, it is to be understood that the exemplary aspects described with respect to the fort 109 shown in the system 1600 may apply to all of the forts 109. As shown in FIG. 16, aspects of the platform that reside within the public cloud 103 include an application administration console 1601 and an updater 1602.

The application administration console 1601 of the platform may be responsible for providing an administrator of the platform and/or the private cloud 113 with an interface that to perform configuration and maintenance operations on the forts 109. For example, the application administration console 1601 may be used to register a fort 109 (e.g., register a local instance of the SaaS platform) by providing a configuration file, such as a Privacy Enhanced Mail (PEM) file, via the interface. The configuration file may be provided via the application administration console 1601 in order to start an association between the platform and a newly set up/registered (or updated/recovered) fort 109.

As another example, the application administration console 1601 may allow the administrator to: recover settings associated with the fort 109 or the platform, determine an overall health status of the fort 109, and/or interact with metrics relating to the fort 109 (e.g., operational data and metadata relating to the proprietary data). In some examples, the fort 109 may implemented as a virtual machine (VM) within the private cloud 113. The VM may be comprised of a plurality of analytics services. For example, the VM may include a dedicated Kubernetes™ cluster.

The updater 1602 may allow the administrator to configure the fort 109 and perform certain base operations, such as updating the fort's 109 image file of the platform's analytics stack (e.g., a Docker container) to a latest version thereof. As another example, the updater 1602 may enable the administrator to revert changes made to the fort 109 (e.g., following an update that results in errors). As a further example, the updater 1602 may enable the administrator to make updates to an operating system(s) and/or components of the fort 109. The updater 1602 may push security updates to the fort 109. The updater 1602 may allow updates to be scheduled.

A fort 109 may be created/set up within the private cloud 113 as a virtual machine or cloud-based machine comprising an image file (e.g., a Docker container) of the platform's analytics stack. For example, the image file may contain all the necessary services to run a local instance of the platform within the private cloud 113 (e.g., behind the enterprise's/organization's firewall). The image file may be compatible with any cloud or virtual environment. The application administration console 1601 may be used to download a latest version of the image file from the platform via the public cloud 103. Using the application administration console 1601, the administrator may configure the virtual and/or cloud-based infrastructure in which the forts 109 may operate. For example, the application administration console 1601 may allow the administrator to: configure a size of the local instance(s) of the platform running in the forts 109, configure an amount of system memory necessary to query the one or more database(s) 111, and/or configure a number and sizes of engines of the analytics backed 107 that may be required to query the one or more database(s) 111.

When creating/setting up a fort 109, the application administration console 1601 may require that the administrator attach a configuration file (e.g., a PEM file) that starts a registration/association process between the platform and the created/set up fort 109. The configuration file may comprise cryptographic keys, certificates, and other data for registering/associating the new fort 109 with the platform. The application administration console 1601 may indicate any recently created/set up fort 109 in a list. The administrator may use the application administration console 1601 to create/set up additional forts 109 or create a managed space that points to the recently created/set up fort 109. Other examples of the application administration console 1601 are possible.

Figure 17:
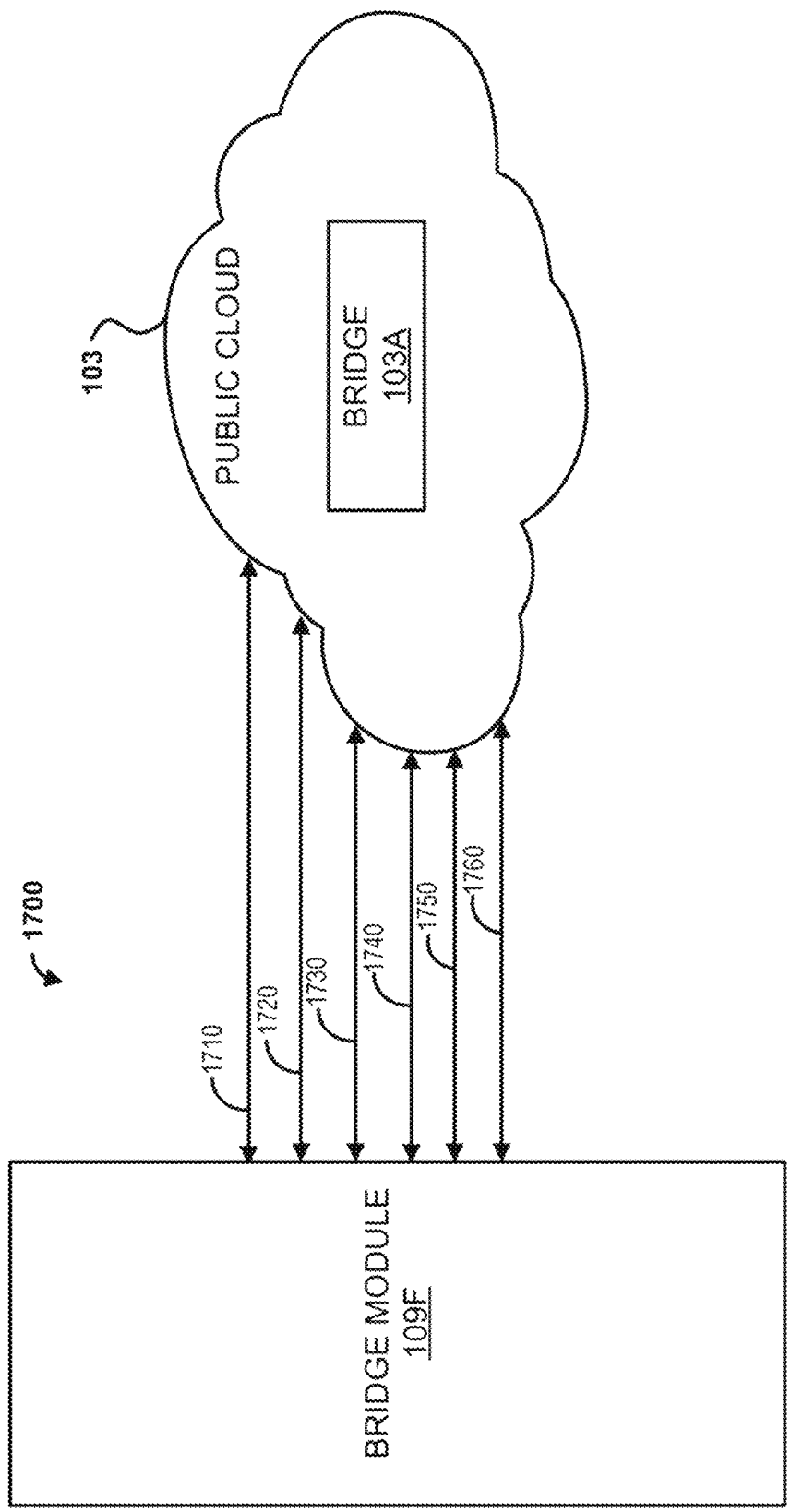
FIG. 17 shows an example system.

FIG. 17 shows further example functionality of the respective bridge module 109F of the fort 109 and bridge module 103A of the public cloud 103. For example, the bridge module 109F and bridge module 103A may communicate via a communication session 1710 to start a registration process for the fort 109 with the platform (e.g., register a local instance of the SaaS platform). As another example, the bridge module 109F and bridge module 103A may communicate via a communication session 1720 to negotiate encryption and authentication keys (e.g., configuration file(s), certificate(s), etc.). The bridge module 109F and bridge module 103A may communicate via a communication session 1730 to establish HTTPS/WebSocket communication sessions (e.g., for passing commands/queries related to the SaaS platform). The bridge module 109F and bridge module 103A may communicate via a communication session 1740 to pass configuration settings. The bridge module 109F and bridge module 103A may communicate via a communication session 1750 to bridge communications between NATS queues. The bridge module 109F and bridge module 103A may communicate via a communication session 1760 to renegotiate security keys. Other examples of communication using the bridge module 109F and bridge module 103A are possible.

Figure 18A:
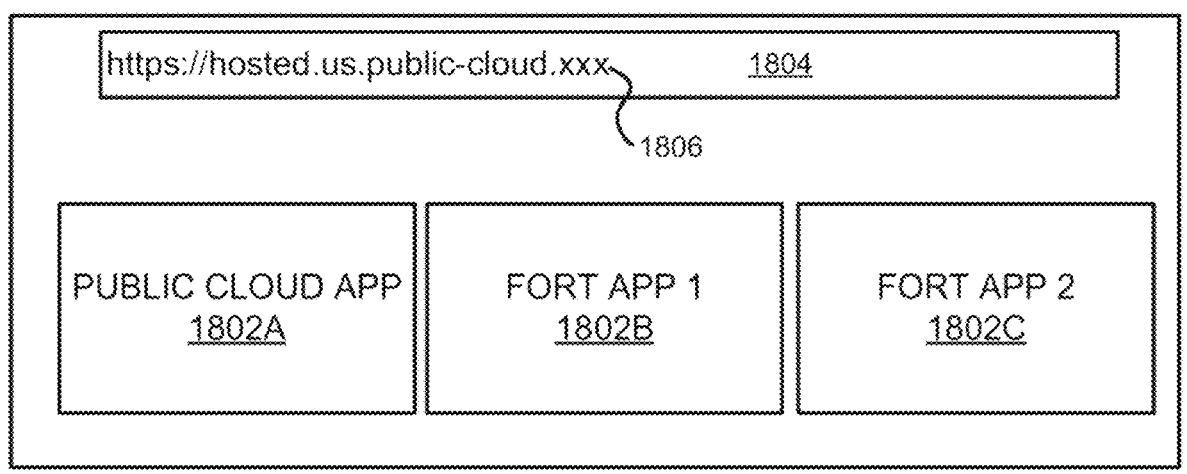
FIG. 18A shows an example interface.
Figure 18B:
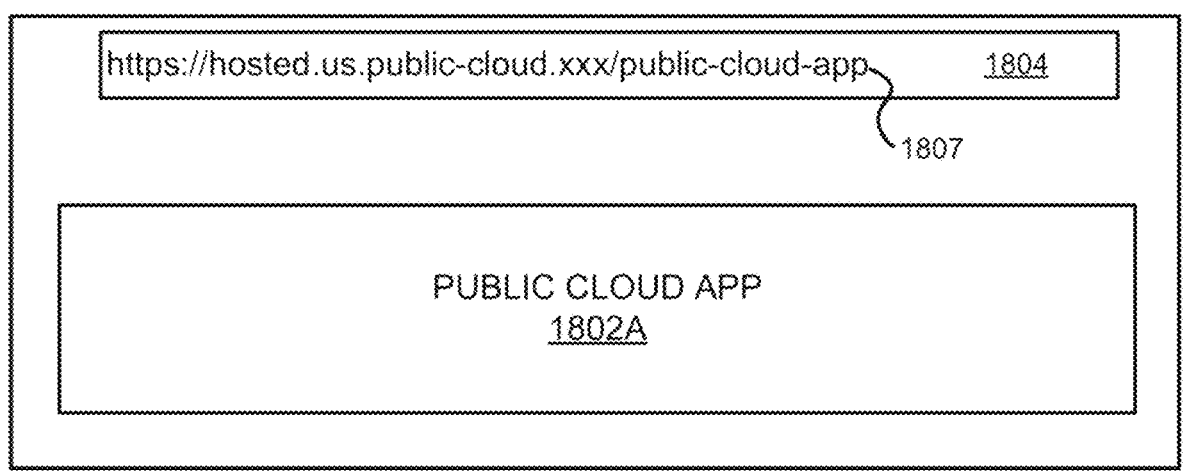
FIG. 18B shows an example interface.
Figure 18C:
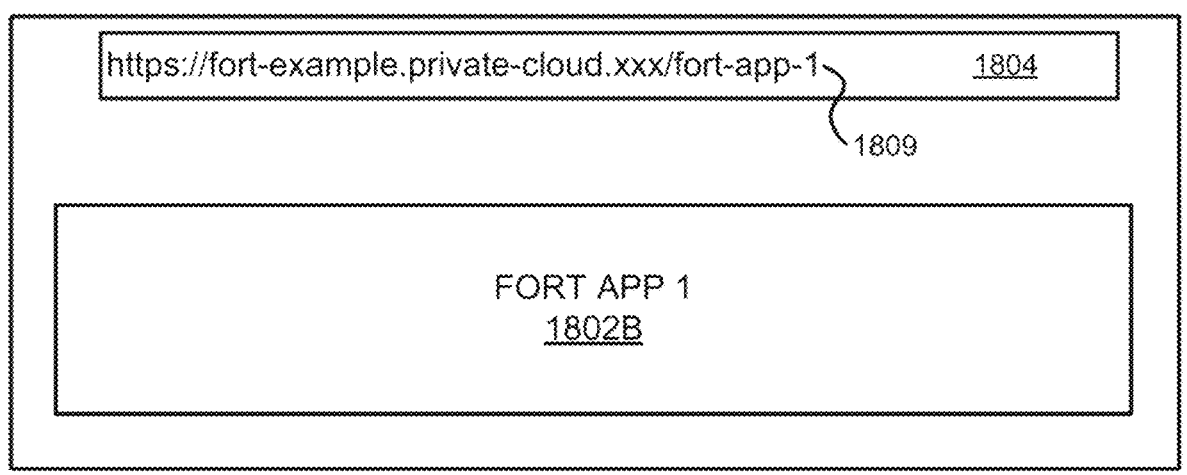
FIG. 18C shows an example interface.

As discussed herein, each of the forts 109 may be a local instance of the SaaS platform. The forts 109 may be used to separate the data plane and the control plane in order to allow a user of the user 105 to access the proprietary data housed in the one or more databases 111 while retaining all of the proprietary data within the private cloud 113 (e.g., within the enterprise/organization). The system 101 may be configured such that a user of the user device 105 may have a seamless experience as they move between content located within the public cloud 103 and the private cloud 113. For example, the user of the user device 105 may access content and/or services of the SaaS platform via the public cloud 103 and a browser interface (e.g., an Internet browser application) of the user device 105. Example browser interfaces 1800, 1810, and 1820 of the user device 105 are shown in. FIGS. 18A-18C. The user device 105 may access content and/or services of the SaaS platform via the public cloud 103 via a secure session. The secure session may comprise a HTTPS session, a Message Queuing Telemetry Transport (MQTT) session, use of one or more WebSockets, etc. The secure session may facilitate communications between the fort 109 and the public cloud 103. For example, as shown in FIG. 18A, the browser interface 1800 may comprise an address bar 1804 in which a first Uniform Resource Locator (URL) 1806 may be entered (e.g., via the user device 105) to access the content and/or services of the SaaS platform via the public cloud 103. The first URL 1806 may comprise a public domain/address associated with the public cloud 103 and the SaaS platform, such as "http://hosted.us.public-cloud.xxx."

The browser interface 1800 may be associated with the control plane of the SaaS platform. The browser interface 1800 may comprise a plurality of objects 1802A-1802C. The plurality of objects 1802A-1802C may comprise shortcuts, buttons, browser links, etc., that are each associated with content, a service(s), and or an application(s) of the SaaS platform. For example, as shown in the browser interface 1800, a first object 1802A may navigate via the secure session to a public application of the SaaS platform that resides entirely within the public cloud 103 (e.g., all data associated therewith is stored within the public cloud 103). FIG. 18B shows an example browser interface 1810. The user of the user device 105 may select the first object 1802A in order to navigate via the secure session to the browser interface 1810 to interact with the public application via the secure session. The public application may be associated with a second URL 1807. The second URL 1807 may comprise a public domain/address associated with the public cloud 103 and the SaaS platform, such as "http://hosted.us.public-cloud.xxx/public-cloud-app."

A second object 1802B (and a third object 1802C—or more) may each be used to navigate via the secure session to private applications that reside within the fort 109. The private applications may each comprise content and/or services of the local instance of the SaaS platform and/or the analytics backend 107 within the fort 109 and/or the private cloud 113. Proprietary data required by the content and/or the services associated with the private application may be accessed via browser calls within the secure session that are initiated at the user device's 105 browser. The browser calls for the required proprietary data may be made directly to the fort 109, the analytics backend 107, and/or another device(s) within the private cloud 113 via the secure session. All communications between the control plane of the SaaS platform within the public could 103 and the fort 109 within the private cloud 113 may be initiated by browser calls made directly to the fort 109 via the secure session. For example, FIG. 18C shows an example browser interface 1820 associated with the second object 1802B. The user of the user device 105 may select the second object 1802B in order to navigate to the browser interface 1820 to interact with the first private application via the secure session. The first private application may be associated with a third URL 1809. The third URL 1809 may comprise a private domain/address associated with the private cloud 113 and/or the fort 109 (e.g., the local instance of the SaaS platform and/or the analytics backend 107 within the fort 109 and/or the private cloud 113). For example, the third URL 1809 may comprise "http://fort-example.private-cloud.xxx/fort-app-1," which may be a URL associated with the fort 109, the private cloud 113, the analytics backend 107, a combination thereof, and/or the like. The browser interfaces 1800-1830 and the browser calls initiated by the user device's 105 browser via the secure session may provide the user of the SaaS platform with a seamless experience as they move between content located within the public cloud 103 and the private cloud 113 via the secure session.

The user of the user device 105 may interact with the first private application to generate one or more queries associated with the proprietary data stored at the fort 109 and/or the private cloud 113. For example, the first private application may comprise a user interface, similar to the user interface illustrated in FIG. 14. The user interface of the first private application may allow the user to indicate a selection of the proprietary data to be analyzed (e.g., via selection of list boxes and other selection tools in the user interface). The selection of the proprietary data, similar to the selection 1300 described herein, may operate on a scope (e.g., the scope 1301) of the proprietary data to generate a data subset (e.g., the data subset 1302). The data subset can form a state space, which may be based on a selection state associated with the selection. For example, the selection state (or "user state") can be defined by the user clicking on list boxes and graphs in the user interface of the first private application (e.g., via the user device 105 and the secure session). The user interface of the first private application can be designed to host a number of graphical objects (charts, tables, etc.) that cause an evaluation(s) within/by the fort 109 and/or the analytics backend 107 of one or more mathematical functions (also referred to as an "expression") on the data subset for one or more dimensions of the data (e.g., classification variables) as indicated by the selection. The engine module 109A of the fort 109 and/or the analytics backend 107 may evaluate the one or more mathematical functions on the data subset using the one or more components of the associative data indexing engine 100, which may reside as a local instance of the SaaS platform within the engine module 109A of the fort 109 and/or the analytics backend 107. In this way, the engine module 109A of the fort 109 and/or the analytics backend 107 may process selections, queries, evaluations, and visualizations in the same manner as described herein as it relates to the associative data indexing engine 100. The result of an evaluation may comprise a visualization, such as the chart result 1303 described herein, which may comprise a multidimensional cube output as one or more the graphical objects.

As discussed herein, the present methods and systems may be computer-implemented. FIG. 19 shows a block diagram depicting a system/environment 1900 comprising non-limiting examples of a computing device 1901 and a server 1902 connected through a network 1904. Any of the forts 109 or the databases 111 may be a computing device, such as the computing device 1902. In an aspect, some or all steps of any described method may be performed on a computing device as described herein. The server 1902 may comprise one or multiple computers configured to store proprietary data 1923 and/or an SaaS stack 1929 of the SaaS platform described herein. Multiple servers 1902 may communicate with the computing device 1901 via the through the network 1904.

The computing device 1901 and the server 1902 may be a digital computer that, in terms of hardware architecture, generally includes a processor 1908, system memory 810, input/output (I/O) interfaces 1912, and network interfaces 1914. These components (808, 1910, 1912, and 1914) are communicatively coupled via a local interface 1916. The local interface 1916 may be, for example, but not limited to, one or more buses or other wired or wireless connections, as is known in the art. The local interface 1916 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1908 may be a hardware device for executing software, particularly that stored in system memory 810. The processor 1908 may be any custom made or commercially available processor, a central processing unit (CPU), an auxiliary processor among several processors associated with the computing device 1901 and the server 1902, a semiconductor-based microprocessor (in the form of a microchip or chip set), or generally any device for executing software instructions. When the computing device 1901 and/or the server 1902 is in operation, the processor 1908 may be configured to execute software stored within the system memory 810, to communicate data to and from the system memory 1910, and to generally control operations of the computing device 1901 and the server 1902 pursuant to the software.

The I/O interfaces 1912 may be used to receive user input from, and/or for providing system output to, one or more devices or components. User input may be provided via, for example, a keyboard and/or a mouse. System output may be provided via a display device and a printer (not shown). I/O interfaces 1912 may include, for example, a serial port, a parallel port, a Small Computer System Interface (SCSI), an infrared (IR) interface, a radio frequency (RF) interface, and/or a universal serial bus (USB) interface.

The network interface 1914 may be used to transmit and receive from the computing device 1901 and/or the server 1902 on the network 1904. The network interface 1914 may include, for example, a 8BaseT Ethernet Adaptor, a 80BaseT Ethernet Adaptor, a LAN PHY Ethernet Adaptor, a Token Ring Adaptor, a wireless network adapter (e.g., WiFi, cellular, satellite), or any other suitable network interface device. The network interface 1914 may include address, control, and/or data connections to enable appropriate communications on the network 1904.

The system memory 1910 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 1910 may incorporate electronic, magnetic, optical, and/or other types of storage media. Note that the system memory 1910 may have a distributed architecture, where various components are situated remote from one another, but may be accessed by the processor 1908.

The software in system memory 810 may include one or more software programs, each of which comprises an ordered listing of executable instructions for implementing logical functions. In the example of FIG. 19, the software in the system memory 1910 of the server 1902 may comprise a suitable operating system (O/S) 1918. The operating system 1918 essentially controls the execution of other computer programs and provides scheduling, input-output control, file and data management, memory management, and communication control and related services.

For purposes of illustration, application programs and other executable program components such as the operating system 1918 are shown herein as discrete blocks, although it is recognized that such programs and components may reside at various times in different storage components of the computing device 1901 and/or the server 1902. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

FIG. 20 shows a flowchart of an example method 2000 for improved analytics. The method 2000 may be performed in whole or in part by a single computing device, a plurality of computing devices, and the like. For example, a computing device(s) within the public cloud 103 may be configured to perform the method 2000.

At step 2010, a first computing device may receive a request to generate a local instance of a platform. The first computing device may be within a public cloud associated with the platform, such as the public cloud 103. The request may be received by the first computing device from a user associated with an on-premises private cloud, such as the private cloud 113. For example, the user may send the request via a user interface, such as the application administration console 1601.

At step 2020, the first computing device may determine that the request is valid. For example, the request may comprise a configuration file. The configuration file may comprise a certificate, such as a Privacy Enhanced Mail (PEM) file. Determining that the request is valid may comprise determining that one or more cryptographic keys within the configuration file are valid. At step 2030, the first computing device may send an image file. For example, the second computing device may be one of a plurality of forts (e.g., the forts 109) within the on-premises private cloud. The image file may comprise one or more analytics tools associated with the platform. The one or more analytics tools may be part of an analytics stack, such as the associative data indexing engine 100 described herein.

At step 2030, the first computing device may cause the image file to be installed at the second computing device. For example, the image file be installed at the second computing device within a virtual machine or cloud-based environment within the private cloud 113. Upon installation of the image file, the second computing device may generate the local instance of the platform.

FIG. 21 shows a flowchart of an example method 2100 for improved analytics. The method 2100 may be performed in whole or in part by a single computing device, a plurality of computing devices, and the like. For example, a first computing device within the public cloud 103 and a second computing device within the private cloud 113 (e.g., a fort 109) may be configured to perform the method 2100. Each of the first computing device and the second computing device may comprise a single device or a system/network of devices and/or modules.

The first computing device, such as the user device 105 described herein, may interact with a control plane of a SaaS platform. A user of the first computing device may access content and/or services of the SaaS platform via the control plane and a browser (e.g., an Internet browser application) of the first computing device. At step 2110, the first computing device may establish a secure session with the control plane (e.g., content and/or services) of the SaaS platform. For example, the first computing device may establish the secure session with the control plane via a public cloud (e.g., the public cloud 103). The secure session may comprise a HTTPS session, a Message Queuing Telemetry Transport (MQTT) session, use of one or more WebSockets, etc. The secure session may facilitate communications between the second computing device and the first user device via the public cloud and a private cloud. The second computing device may reside within the private cloud (e.g., the private cloud 113). The first computing device may establish the secure session with the control plane via the browser. For example, a first browser interface (e.g., the browser interface 1800) may comprise an address bar (e.g., the address bar 1804). At step 2120, the first computing device may receive, via the address bar of the browser, a first Uniform Resource Locator (URL) (e.g., the first URL 1806). The first URL may be configured to access the control plane via the public cloud and the secure session. The first URL may comprise a public domain/address associated with the public cloud and the SaaS platform, such as "http://hosted.us.public-cloud.xxx."

The first browser interface may be associated with the control plane of the SaaS platform. The first browser interface may comprise a plurality of objects (e.g., the plurality of objects 1802A-1802C) The plurality of objects may comprise shortcuts, buttons, browser links, etc., that are each associated with content, a service(s), and or an application(s) of the SaaS platform. The first computing device may receive a selection of a first object of the plurality of objects (e.g., via the browser interface). The selection of the first object may cause the first computing device to communicate with the second computing device via the first private application and the secure session. For example, selection of the first object (e.g., the first object 1802B) may navigate via the secure session to the first private application that resides within the second computing device and/or the private cloud. The first private application may comprise content and/or services of a local instance of the SaaS platform. Proprietary data required by the content and/or the services associated with the private application may be accessed via browser calls within the secure session that are initiated at the browser. The selection of the first object may cause the browser to navigate to a private URL (e.g., the third URL 1809) associated with the first private application. The private URL may comprise a private domain/address associated with the private cloud and/or the second computing device.

At step 2130, the first computing device may send one or more commands to the first private application via the secure session. The one or more commands may comprise the browser calls within the secure session that are initiated at the browser. The browser calls for any required proprietary data may be made directly to the second computing within the private cloud via the secure session. For example, the user of the first computing device may interact with the first private application to generate one or more queries associated with the proprietary data stored at the second computing device and/or the private cloud. The one or more commands may be associated with the one or more queries.

A user interface of the first private application may allow the user of the first computing device to indicate a selection of the proprietary data to be analyzed (e.g., via selection of list boxes and other selection tools in the user interface). The selection of the proprietary data, similar to the selection 1300 described herein, may operate on a scope (e.g., the scope 1301) of the proprietary data to generate a data subset (e.g., the data subset 1302). The data subset can form a state space, which may be based on a selection state associated with the selection. For example, the selection state (or "user state") can be defined by the user clicking on list boxes and graphs in the user interface of the first private application (e.g., via the user device 105 and the secure session). The user interface of the first private application can be designed to host a number of graphical objects (charts, tables, etc.) that cause an evaluation(s) within/by the second computing device of one or more mathematical functions (also referred to as an "expression") on the data subset for one or more dimensions of the data (e.g., classification variables) as indicated by the selection.

An engine module of the second computing device (e.g., the engine module 109A of the fort 109) may evaluate the one or more mathematical functions on the data subset using the one or more components of the associative data indexing engine 100, which may reside as a local instance of the SaaS platform within the engine module. In this way, the engine module may process selections, queries, evaluations, and visualizations in the same manner as described herein as it relates to the associative data indexing engine 100. The first private application may determine a result of an evaluation associated with the one or more commands. The result of the evaluation may be sent to the first computing device. The result of the evaluation may comprise metadata associated with the proprietary data stored at the second computing device and/or the private cloud. For example, the metadata may comprise one or more summations, aggregations, and/or dimensions associated with the proprietary data (e.g., rather than "raw" values of the individual records of the proprietary data). At step 2140, the first computing device may receive the result of the evaluation. The result of the evaluation may comprise a visualization, such as the chart result 1303 described herein, which may comprise a multi-dimensional cube output as one or more the graphical objects. At step 2150, the first computing device may output the result of the evaluation. For example, the first computing device may output the result of the evaluation as a chart, a graph, or any other suitable visualization. The result of the evaluation may pass from the private cloud and the second computing device to the public cloud and the first computing device via the secure session. However, the corresponding proprietary data required to process the evaluation and output the visualization may not pass to the public cloud or the first computing device. In this way, the proprietary data remains within the private cloud and never crosses into the public cloud, therefore providing a barrier between the public elements of the SaaS platform and the private cloud.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   establishing, by a client computing device, a secure session with a control plane of a software as a service (SaaS) platform;
   outputting, at a browser application of the client computing device, a user interface configured to access a public application of the SaaS platform associated with a public cloud and a private application of the SaaS platform associated with a private cloud;
   sending, by the browser application of the client computing device, via the private application and the secure session, one or more commands to a first computing device of a plurality of computing devices associated with the private cloud, wherein each computing device of the plurality of computing devices comprises a local instance of the SaaS platform comprising one or more private applications of the SaaS platform;
   receiving, by the client computing device from the first computing device, via the private application and the secure session, a result of an evaluation, wherein the one or more commands cause the first computing device to determine, via the local instance of the SaaS platform, the result of the evaluation; and outputting, by the browser application of the client computing device, via the user interface, the result of the evaluation as a visualization.

2. The method of claim 1, wherein the secure session comprises at least one of: an HTTPS session, a Message Queuing Telemetry Transport (MQTT) session, or one or more Web Sockets.

3. The method of claim 1, further comprising: receiving, via an address bar of a browser application of the client computing device, a first Uniform Resource Locator (URL), wherein the first URL is configured to access the control plane via the public cloud and the secure session.

4. The method of claim 3, wherein the one or more commands comprise one or more browser calls of the browser application, and wherein the one or more browser calls cause the local instance of the SaaS platform at the first computing device to determine the result of the evaluation.

5. The method of claim 3, wherein the one or more commands are associated with the one or more queries of data stored at one or more of the plurality of computing devices, wherein the one or more commands cause the local instance of the SaaS platform at the first computing device to determine the result of the evaluation, and wherein the data remains within the private cloud.

6. The method of claim 5, wherein the result of the evaluation comprises metadata associated with the data stored at one or more of the plurality of computing devices, wherein the metadata is indicative of the one or more queries.

7. The method of claim 1, wherein the visualization comprises one or more of a chart or a graph.

* * * * *